United States Patent
Tann et al.

(10) Patent No.: US 9,215,501 B2
(45) Date of Patent: Dec. 15, 2015

(54) CONTEXTUAL MATTE BARS FOR ASPECT RATIO FORMATTING

(71) Applicant: APPLE INC., Cupertino, CA (US)

(72) Inventors: Christopher P. Tann, San Jose, CA (US); Robert L. Ridenour, Menlo Park, CA (US); Sandro H. Pintz, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 216 days.

(21) Appl. No.: 13/748,232

(22) Filed: Jan. 23, 2013

(65) Prior Publication Data

US 2014/0204127 A1 Jul. 24, 2014

(51) Int. Cl.
*H04N 21/4402* (2011.01)
*H04N 7/01* (2006.01)

(52) U.S. Cl.
CPC ..... *H04N 21/440272* (2013.01); *H04N 7/0122* (2013.01)

(58) Field of Classification Search
None
See application file for complete search history.

(56) References Cited

U.S. PATENT DOCUMENTS

| | | | |
|---|---|---|---|
| 7,663,663 B2 | 2/2010 | Prusia et al. | |
| 7,742,059 B2 * | 6/2010 | Kouninski | 345/598 |
| 7,969,509 B2 | 6/2011 | Harris | |
| 2005/0219188 A1 * | 10/2005 | Kawabe et al. | 345/94 |
| 2007/0120763 A1 * | 5/2007 | De Paepe et al. | 345/1.3 |
| 2008/0055314 A1 | 3/2008 | Ziemski | |
| 2010/0007788 A1 * | 1/2010 | Lee et al. | 348/445 |
| 2012/0050276 A1 * | 3/2012 | Chiba | 345/419 |
| 2012/0105335 A1 * | 5/2012 | Suddreth et al. | 345/173 |
| 2012/0218312 A1 * | 8/2012 | Goldsmith et al. | 345/690 |
| 2014/0002428 A1 * | 1/2014 | Letourneur et al. | 345/207 |

FOREIGN PATENT DOCUMENTS

| | | | | |
|---|---|---|---|---|
| GB | WO2012/153290 | * 11/2012 | | G06F 3/14 |
| WO | 2005009024 A2 | 1/2005 | | |

* cited by examiner

*Primary Examiner* — Maurice L McDowell, Jr.
*Assistant Examiner* — Donna J Ricks
(74) *Attorney, Agent, or Firm* — Fletcher Yoder PC

(57) ABSTRACT

Systems, methods, and devices for adding contextual matte bars to format image data to another aspect ratio are provided. For example, a method may include receiving image data of a first aspect ratio into a processor. The processor may receive a characteristic of a destination display of a second aspect ratio, an indication of ambient lighting, an indication of a characteristic of the image data, or any number of these factors. The processor may add matte bars to the image data to cause the image data to be formatted to the second aspect ratio. The appearance of the matte bars may depend on the factors received by the processor. The formatted image data with these contextual matte bars then may be sent from the processor to the destination electronic display.

23 Claims, 19 Drawing Sheets

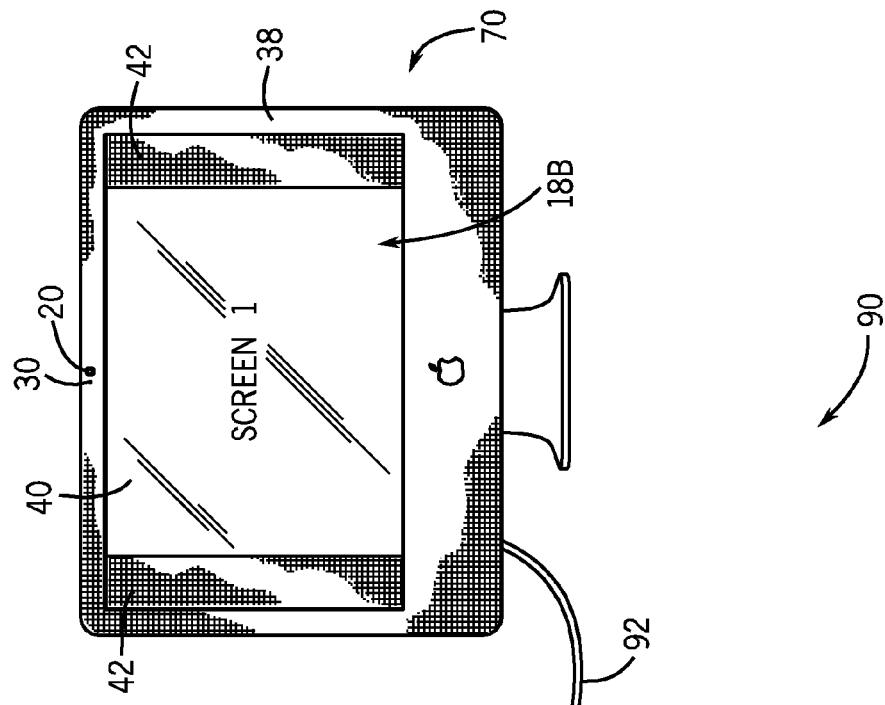
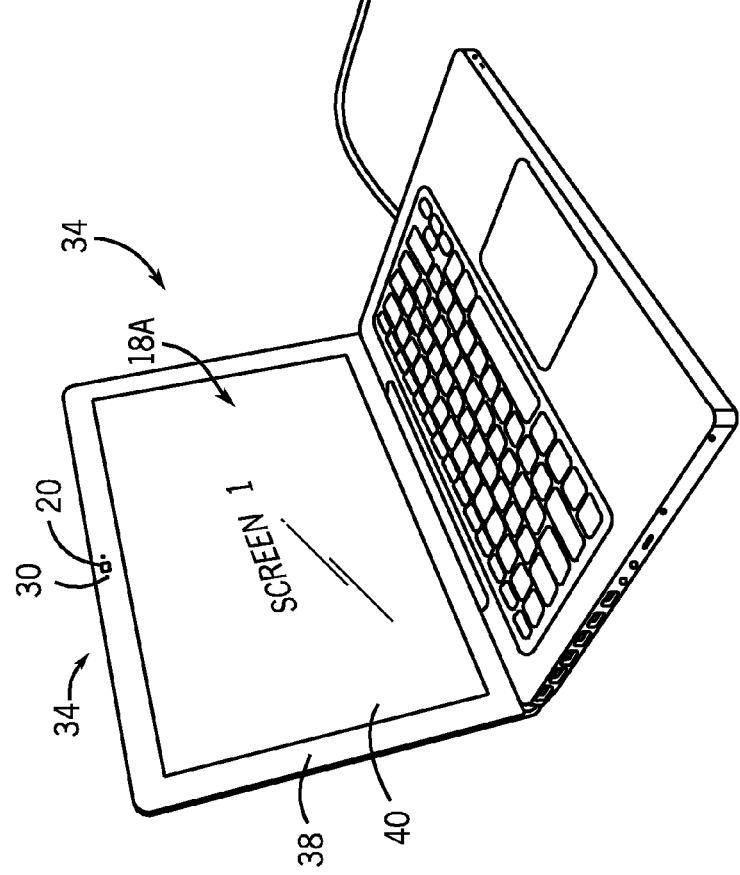
FIG. 6

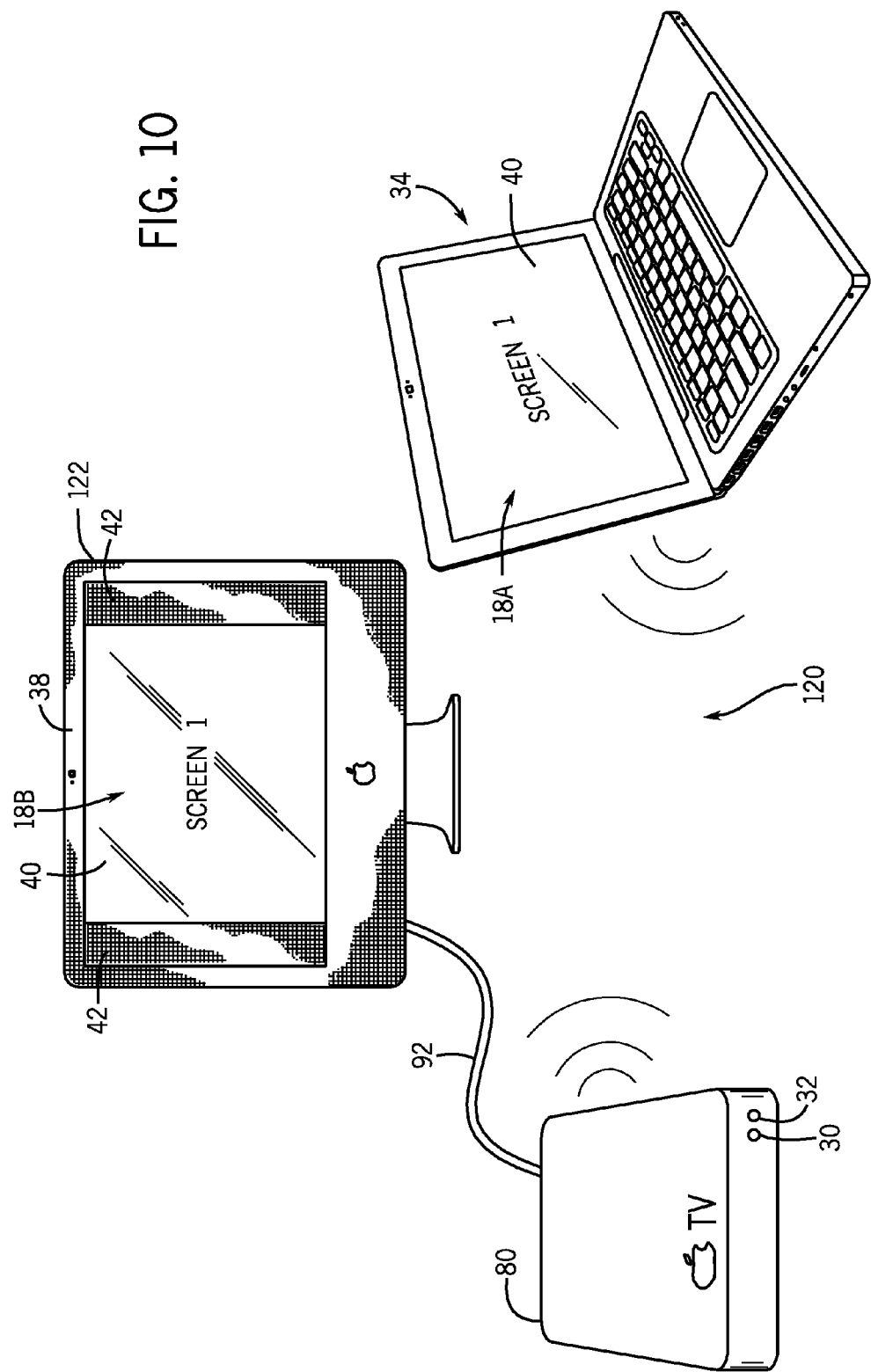

CONTEXTUAL MATTE BARS FOR ASPECT RATIO FORMATTING

BACKGROUND

This disclosure relates generally to formatting image data to another aspect ratio and, more particularly, to formatting such image data by adding contextual matte bars.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays of various aspect ratios appear in computers, handheld devices, televisions, and many other electronic devices. Popular tablet computing devices, for example, may use displays with aspect ratios of 4:3, while televisions may use displays with aspect ratios of 16:9. To display image data of a first aspect ratio on an electronic display of a second aspect ratio, black matte bars are typically added to the top and bottom or the sides of the image data to accommodate the change in aspect ratio. For example, image data with a 4:3 aspect ratio that is being sent to a display with a 16:9 aspect ratio may have black matte bars added on the left and right sides of the 4:3—size image data. On the other hand, image data with a 16:9 aspect ratio that is being sent to a display with a 4:3 aspect ratio may have black matte bars added on the upper and lower sides of the 16:9—size image data.

Such black matte bars may not always be visually appealing. Indeed, black matte bars may appear inappropriate in some contexts. For example, different electronic displays may be housed in devices of different colors or styles. The devices may be operated in different ambient conditions. Even so, reformatted image data displayed on such devices often includes the same black matte bars without regard to the context in which the image data is viewed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for adding contextual matte bars to format image data to another aspect ratio. For example, a method for adding contextual matte bars may include receiving first image data of a first aspect ratio into a processor. The processor may additionally receive an indication of a characteristic of a destination electronic display having a second aspect ratio, or an indication of an ambient condition of the destination electronic display, or both, into the processor. The processor may add matte bars to the first image data or a scaled version of the first image data to produce second image data of the second aspect ratio, in which an appearance of the matte bars depends on the characteristic of the destination electronic display, an ambient condition of the destination electronic display, image data characteristics (e.g., as determined by the processor), or any combination of these factors. The image data then may be sent from the processor to the destination electronic display.

As mentioned above, generating the matte bars may involve considering characteristics relating to the destination electronic display, ambient conditions, and/or image data characteristics. To provide a few examples, the destination display characteristics may include a color of a bezel of the electronic display and/or an indication of a proclivity of the electronic display for image burn-in. The ambient conditions may include an ambient brightness, a color temperature of ambient light, a feedback image from a camera facing the destination electronic display, or some combination of these. Image data characteristics that may be considered may include motion, a type of media being considered, and/or color. These various characteristics may be considered to adjust a color of the contextual matte bars, a visual texture, a gradient, an amount of variability over time, and/or a relationship between the matte bars and a corresponding user interface in the surrounded image data.

In some embodiments, the appearance of the contextual matte bars may be preprogrammed based on the color of the bezel surrounding the display. For instance, a display with a silver bezel may be programmed to generally output silver contextual matte bars by default, while a display with a black bezel may be programmed to generally output black contextual matte bars by default.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 is a schematic view of a system to format image data of a first aspect ratio for display at a second aspect ratio using contextual matte bars, in accordance with an embodiment;

FIG. 9 is a block diagram of a system in which a source device adds dynamic contextual matte bars to format image data for display at a second aspect ratio, in accordance with an embodiment;

FIG. 10 is a schematic view of a system to format image data for display at a second aspect ratio using an intermediate device that adds contextual matte bars, in accordance with an embodiment;

DETAILED DESCRIPTION

Figure 1:
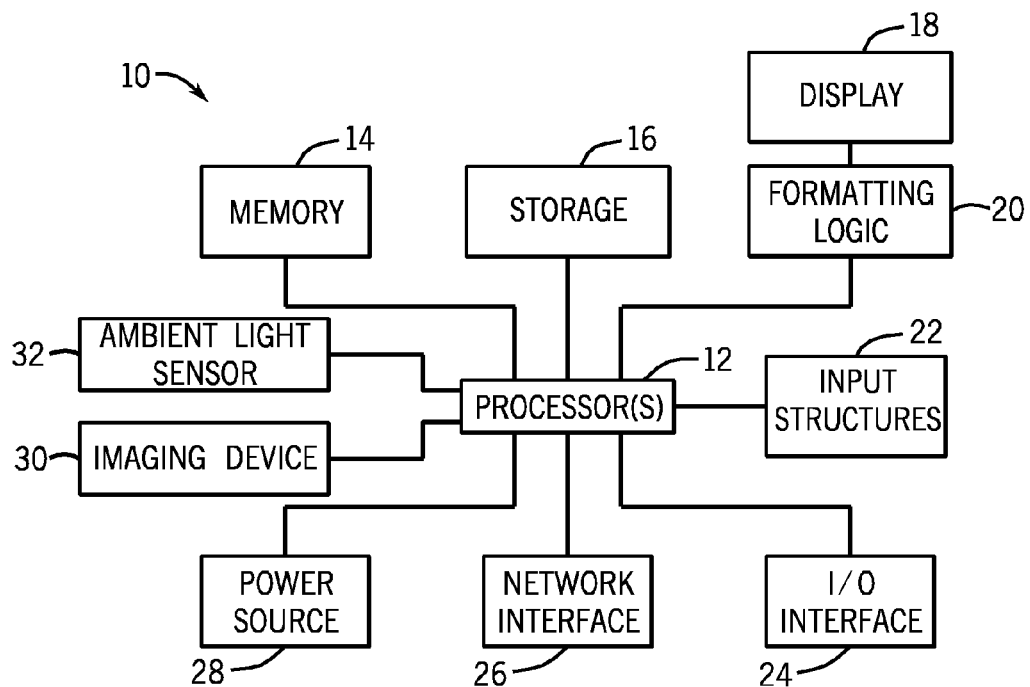
FIG. 1 is a block diagram of an electronic device that can format image data of a first aspect ratio for display at a second aspect ratio by adding contextual matte bars, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure relates to formatting image data of a first aspect ratio for display at a second aspect ratio by adding contextual matte bars. As used in this disclosure, the term "contextual matte bars" refers to matte bars added to image data to change its aspect ratio, the matte bars being selected to match a context in which the image data will be displayed. For example, "contextual matte bars" may be matte bars programmed to be a particular color to match a bezel of a destination display. In another example, "contextual matte bars" may be selected dynamically based on destination display characteristics, ambient conditions of the display, and/or image data characteristics, or any other suitable factors relating to the context in which the image data is viewed. In this way, the appearance of the matte bars may be contextually appropriate to the user that is viewing the display.

In the discussion below, image data originated at a first aspect ratio may be formatted for display at a second aspect ratio by a source electronic device, a destination electronic device, or an intermediate electronic device. As used herein, a "source electronic device" represents an electronic device that generates or otherwise retrieves the image data at a first aspect ratio; a "destination electronic device" represents an electronic device that will display the image data at a second aspect ratio; and an "intermediate electronic device" may or may not be present in all circumstances, but may be used to support the transmission of image data from the source electronic device to the destination electronic device. In one example, a source electronic device may be a notebook computer (e.g., a MacBook Air® by Apple Inc.), an intermediate electronic device may be a set top box media player (e.g., an Apple TV® by Apple Inc.), and the destination electronic device may be a television. In various embodiments, different electronic devices in the example mentioned above may format image data from the source electronic device for display on the destination electronic device. The electronic display of the destination device, which displays the image data with the contextual matte bars, is referred to in this document as the "destination display."

The contextual matte bars may enhance the user experience when formatted image data is viewed on the destination display. For instance, the contextual matte bars may be black when the destination display has a black bezel, but the contextual matte bars may be a silver color or texture when the destination display has a silver or brushed metal bezel. In addition, in some embodiments, such colors and/or textures may change accordingly with ambient conditions. For example, a brushed metal bezel may shimmer in bright sunlight, but may appear to be a soft metallic gray in dimmer or softer lighting. Thus, the contextual matte bars may become brighter or have a stronger shine to match such changes in ambient conditions at the destination display. These examples and more will be discussed in greater detail below.

With the foregoing in mind, many suitable electronic devices may carry out the techniques described in this disclosure. One example appears in FIG. 1, which is a block diagram of various components in an electronic device to generate and/or display image data with contextual matte bars. FIGS. 2-5 respectively illustrate perspective and front views of some suitable implementations of the electronic device of FIG. 1.

Turning first to FIG. 1, an electronic device 10 according to an embodiment of this disclosure may include, among other things, one or more processor(s) 12, memory 14, nonvolatile storage 16, a display 18, input structures 22, an input/output (I/O) interface 24, network interfaces 26, a power source 28, an imaging device 30, and/or an ambient light sensor 32. The various functional blocks shown in FIG. 1 may include hardware elements (including circuitry), software elements (including computer code stored on a computer-readable medium), or a combination of both hardware and software elements. It should be noted that FIG. 1 is merely one example of a particular implementation and is intended to illustrate the types of components that may be present in the electronic device 10.

Figure 2:
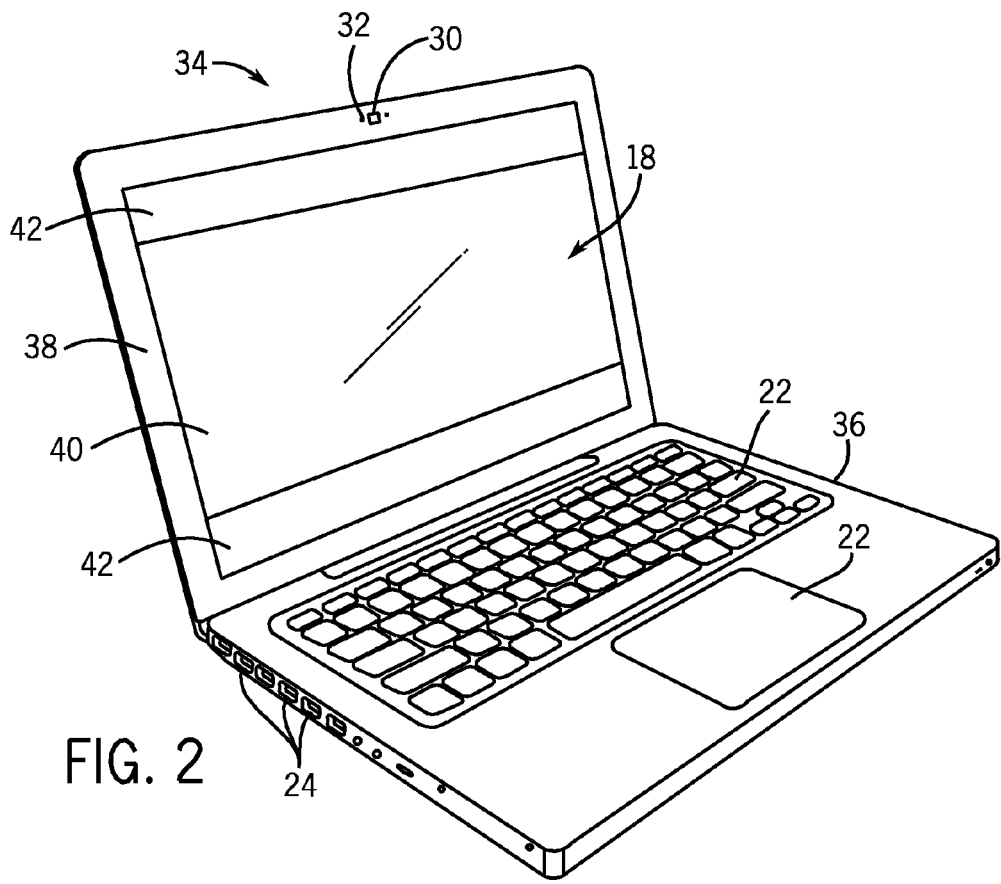
FIG. 2 is a perspective view of the electronic device of FIG. 1 in the form of a notebook computer, in accordance with an embodiment.
Figure 3:
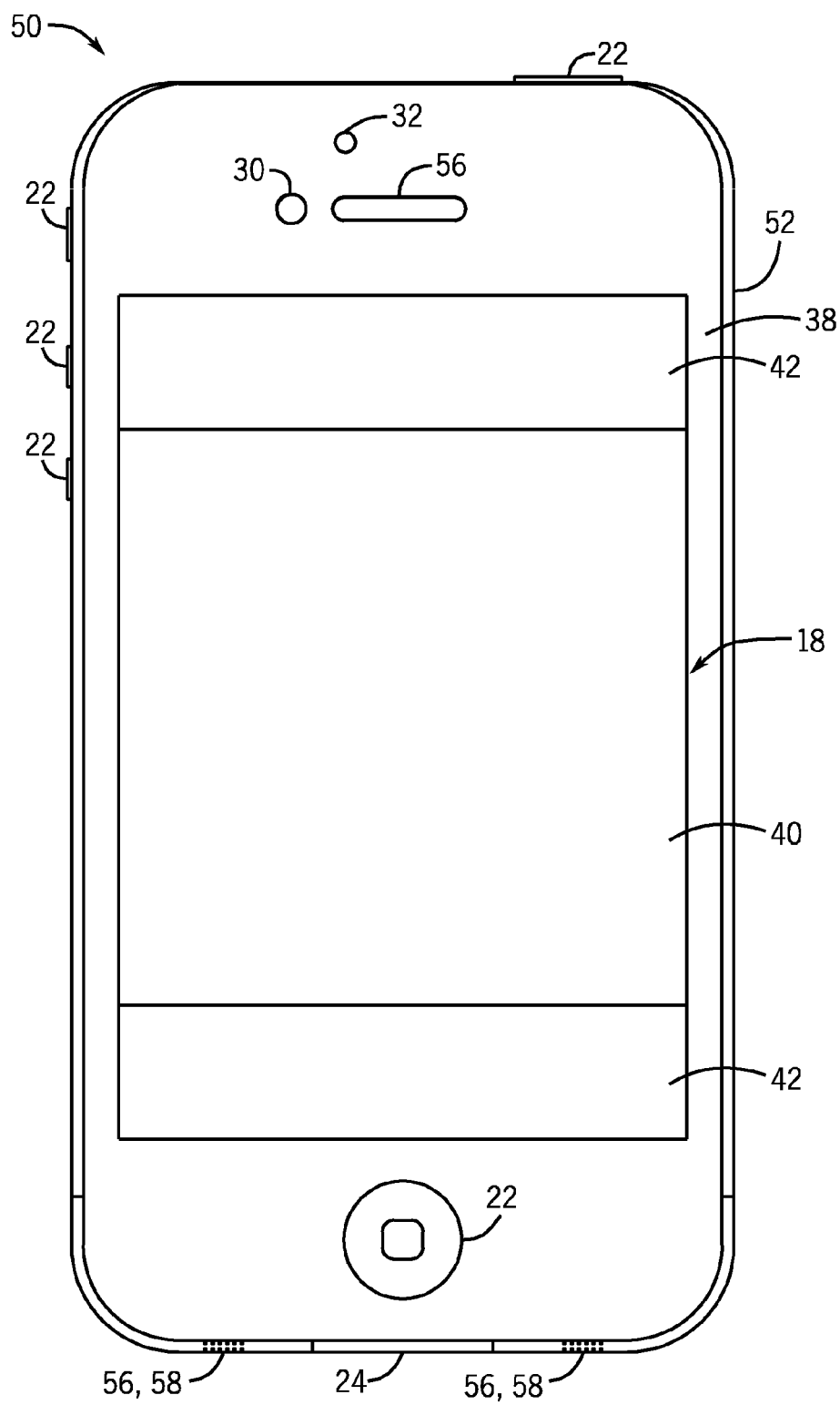
FIG. 3 is a front view of the electronic device of FIG. 1 in the form of a handheld device, in accordance with an embodiment.

By way of example, the electronic device 10 may represent a block diagram of the notebook computer depicted in FIG. 2, the handheld device depicted in FIG. 3, or similar devices. In the electronic device 10 of FIG. 1, the processor(s) 12 and/or other data processing circuitry may be operably coupled with the memory 14 and the nonvolatile memory 16 to execute instructions. For instance, the processor(s) 12 may generate image data to be displayed on the display 18. The display 18 may be a touch-screen liquid crystal display (LCD). In some embodiments, the electronic display 18 may be a Multi-Touch™ display that can detect multiple touches at once.

Image data formatted from a first aspect ratio to a second aspect ratio, whether for display on the display 18 within the electronic device 10 or a similar display 18 outside of the electronic device 10, may be formatted to include contextual matte bars. In the example of FIG. 1, this formatting may occur in formatting logic 20. The formatting logic 20 may represent logic of the display 18, logic implemented by the processor(s) 12 (e.g., in software), or a component separate from either the processor(s) 12 or display 18. As will be discussed below, the formatting logic 20 may format image data of a first aspect ratio for display at a second aspect ratio by adding contextual matte bars.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

In certain examples discussed below, the formatting logic 20 may determine the appearance of the contextual matte bars based on the ambient conditions around the display 18. Some of these ambient conditions may be detected by an imaging device 30 or an ambient light sensor 32. The imaging device 30, which may include a camera and/or image processing logic, may provide information relating to the color temperature of the light. The ambient light sensor 32 may indicate a brightness of the current ambient lighting. Changes in the color temperature and/or brightness of the ambient light may cause the formatting logic 20 to change a corresponding appearance of the contextual matte bars used to format image data.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 34, is illustrated in FIG. 2 in accordance with one embodiment of this disclosure. The depicted computer 34 may include a housing 36, a display 18, input structures 22, and ports of an I/O interface 24. In the example of FIG. 2, the display 18 is surrounded by a bezel 38. Image data 40 and contextual matte bars 42 appear on the display 18. The contextual matte bars 42 may have an appearance that matches the context in which the image data 40 is viewed. For instance, the contextual matte bars 42 may match the color and/or texture of the bezel 38. In another example, the contextual matte bars 42 may vary depending on ambient lighting conditions detected by an imaging device 30 and/or an ambient light sensor 32.

FIG. 3 depicts a front view of a handheld device 50, which represents one embodiment of the electronic device 10. The handheld device 50 may represent, for example, a portable phone, a media player, a personal data organizer, a handheld game platform, or any combination of such devices. By way of example, the handheld device 50 may be a model of an iPod® or iPhone® available from Apple Inc. of Cupertino, Calif. In other embodiments, the handheld device 50 may be a tablet-sized embodiment of the electronic device 10, which may be, for example, a model of an iPad® available from Apple Inc.

The handheld device 50 may include an enclosure 52 to protect interior components from physical damage and to shield them from electromagnetic interference. The enclosure 52 may include a bezel 38 around the display 18. The I/O interfaces 24 may open through the enclosure 38 and may include, for example, a proprietary I/O port from Apple Inc. to connect to external devices. User input structures 22 in combination with the display 18, may allow a user to control the handheld device 50. For example, the input structures 22 may activate or deactivate the handheld device 50. The input structures 22 may navigate a user interface to a home screen, a user-configurable application screen, and/or activate a voice-recognition feature of the handheld device 50. The input structures 22 may provide volume control and/or may toggle between vibrate and ring modes. Speakers 56 may play back audio or allow a user to hear telephone conversations. Microphone(s) 58 may capture audio used in voice-related features of the handheld device 50.

In the example of FIG. 3, like the example of FIG. 2, the display 18 of the handheld device 50 is surrounded by a bezel 38. Image data 40 and contextual matte bars 42 appear on the display 18. The contextual matte bars 42 may have an appearance that matches the context in which the image data 40 is viewed. For instance, the contextual matte bars 42 may match the color and/or physical texture of the bezel 38. In another example, the contextual matte bars 42 may vary depending on ambient lighting conditions detected by an imaging device 30 and/or an ambient light sensor 32.

Figure 4:
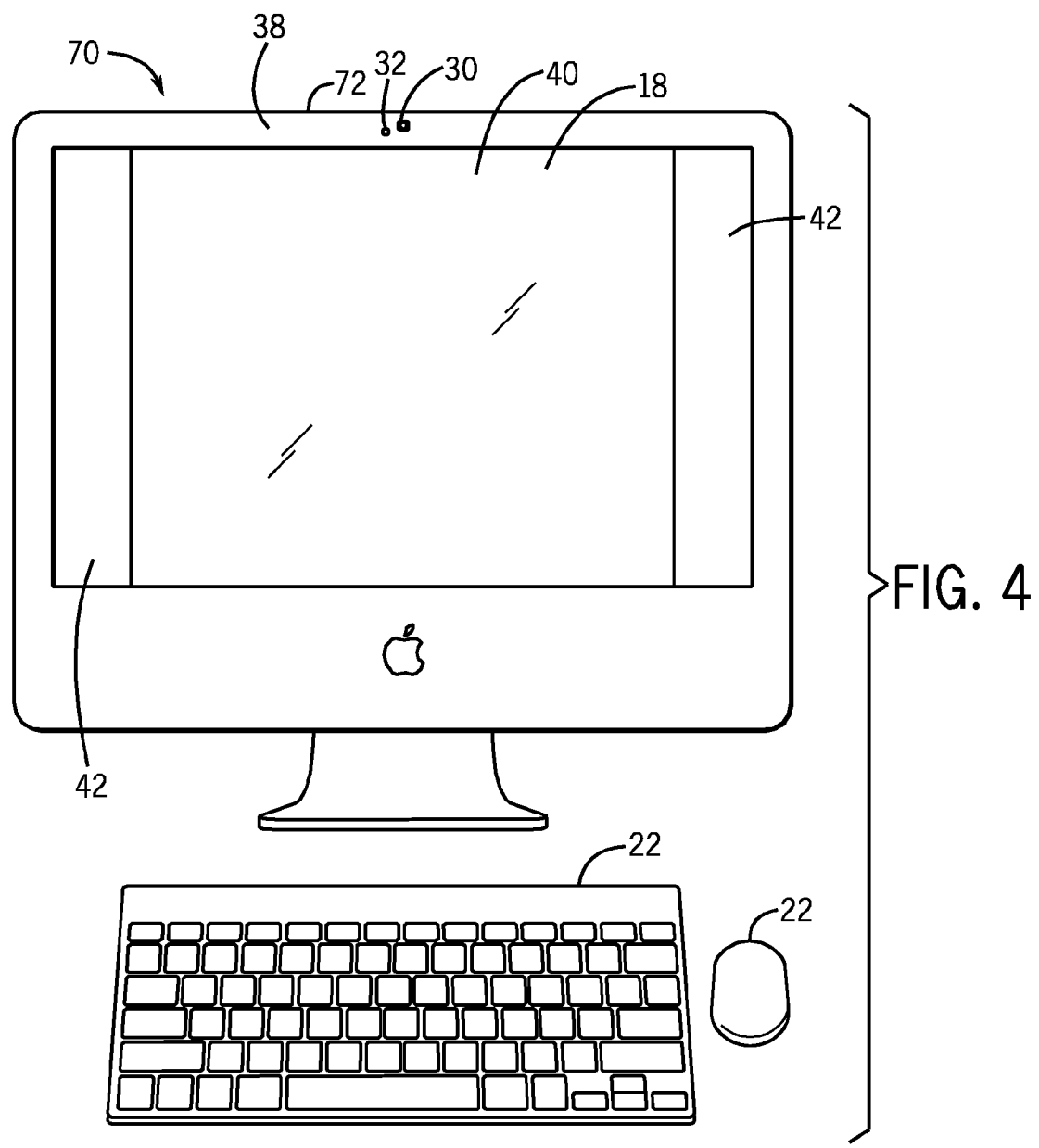
FIG. 4 is a front view of the electronic device of FIG. 1 in the form of a desktop computer, in accordance with an embodiment.

A desktop computer 70, shown in FIG. 4, represents another form of the electronic device 10. The desktop computer 70 may represent, for example, a model of an iMac® by Apple Inc. The desktop computer 70 of FIG. 4 includes various components encased in a housing 72, among those included being the display 18. Input structures 22 of the desktop computer 70 may include a keyboard and a mouse and/or trackpad. The display 18 of the desktop computer 70, too, may be surrounded by a bezel 38. Image data 40 and contextual matte bars 42 appear on the display 18. The contextual matte bars 42 may have an appearance that matches the context in which the image data 40 is viewed. For instance, the contextual matte bars 42 may match the color and/or physical texture of the bezel 38. In another example, the contextual matte bars 42 may vary depending on ambient lighting conditions detected by an imaging device 30 and/or an ambient light sensor 32.

Figure 5:
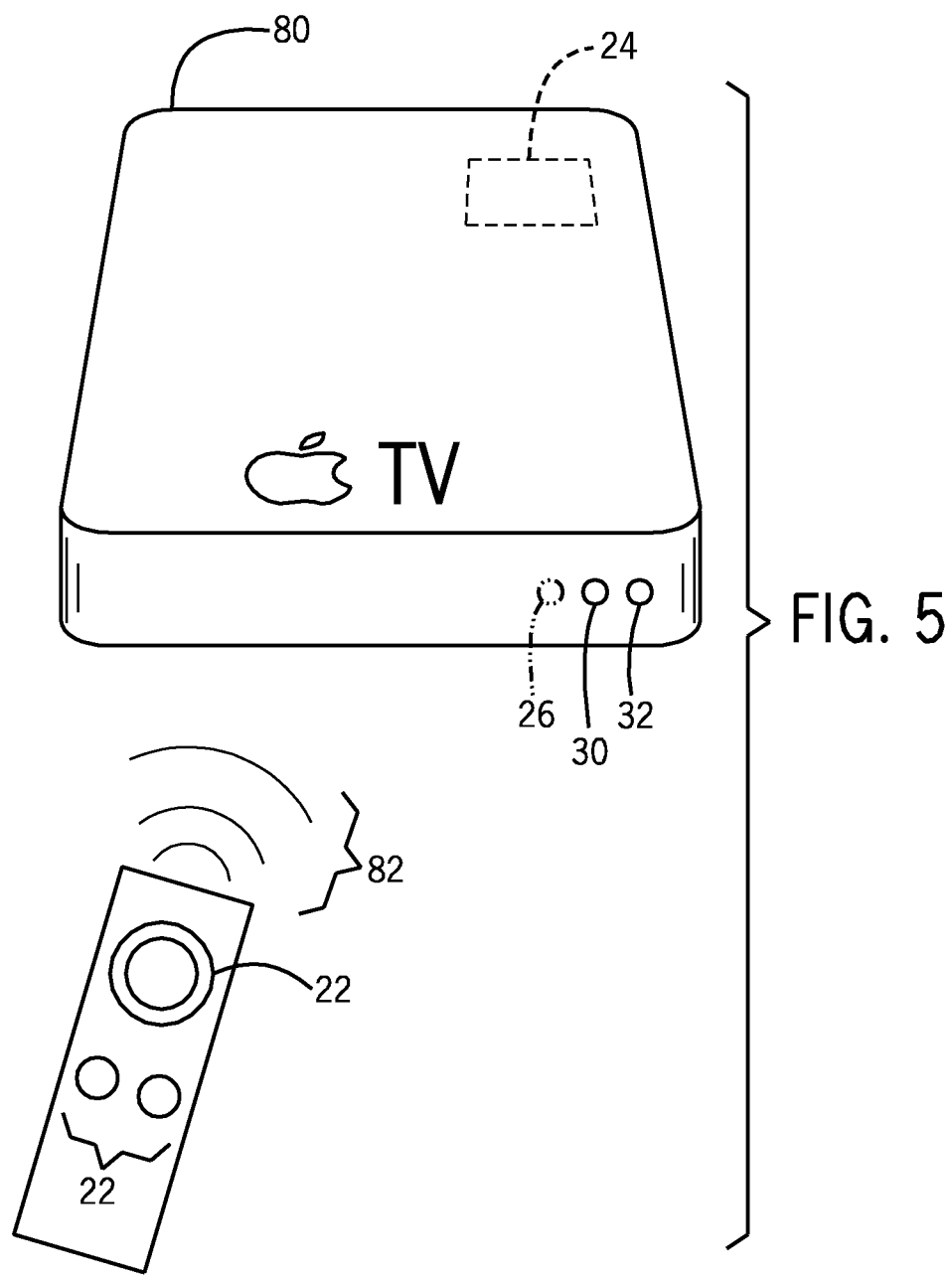
FIG. 5 is a perspective view of the electronic device of FIG. 1 in the form of a set top box media player, in accordance with an embodiment.

Certain embodiments of the electronic device 10 may not include the display 18, but rather may provide image data to another electronic device (e.g., a television or standalone monitor) that does. For example, as seen in FIG. 5, a set top box media player 80 may retrieve image data from another source and provide the image data to an external display 18 through I/O ports 24. Such I/O ports 24 may include, for example, an HDMI video port. In the example of FIG. 5, the set top box media player 80 may employ input structures 22 in the form of buttons on a remote control. Control signals 82 may be retrieved through a network interface 26 (e.g., an infrared interface). By way of example, the set top box media player 80 may represent a model of an Apple TV® by Apple Inc.

As noted above, although the set top box media player 80 may itself lack a display 18, the set top box media player 80 may provide image data to the external display 18, such as a television or computer monitor. In some examples, the set top box media player 80 may add contextual matte bars 42 to image data 40 to format the image data to the aspect ratio of the external display 18. The contextual matte bars 42 generated by the set top box media player 80 may have an appearance that varies depending on, among other things, ambient lighting conditions detected by an imaging device 30 and/or an ambient light sensor 32.

In a variety of instances, a user may desire to view image data created for a first electronic device 10 on a second electronic device 10. For example, as shown in FIG. 6, a user may desire to see original image data 40 ("screen 1") from the user's notebook computer 34 to appear on a desktop computer 70. While the notebook computer 34 may have a display 18A of a first aspect ratio (e.g., 16:10), the desktop computer 70 may have a display 18B of a second aspect ratio (e.g., 16:9). As such, when the notebook computer 34 provides the original image data 40 to the desktop computer 70, either the notebook computer 34 or the desktop computer 70 may add contextual matte bars 42. In the example of FIG. 6, the notebook computer 34 is shown to communicate with the desktop computer 70 by way of a video cable 92. Such a video cable 92 may include, for example, a Thunderbolt cable, a DisplayPort cable, or any other suitable I/O cable to provide at least the original image data 40 to the desktop computer 70. In other examples, however, the notebook computer 34 may communicate with the desktop computer 70 through any other communication. For instance, the notebook computer 34 may communicate wirelessly via a Wi-Fi or Bluetooth network.

Either the notebook computer 34 or the desktop computer 70 may format the original image data 40 of the first aspect ratio to match the second aspect ratio of the display 18B of the desktop computer 70 by adding the contextual matte bars 42. As will be discussed in greater detail below, the contextual matte bars 42 may have an appearance that has been selected based on the context of their application. For example, the contextual matte bars 42 may have a color and/or texture that matches the bezel 38 of the desktop computer 70. The camera 30 and/or ambient light sensor 32—on either the notebook computer 34 or the desktop computer 70, depending on the specific implantation—may also provide ambient lighting conditions, allowing the contextual matte bars 42 to change color, brightness, and/or texture to more closely match the appearance of the bezel 38 as would be seen by the user.

Figure 7:
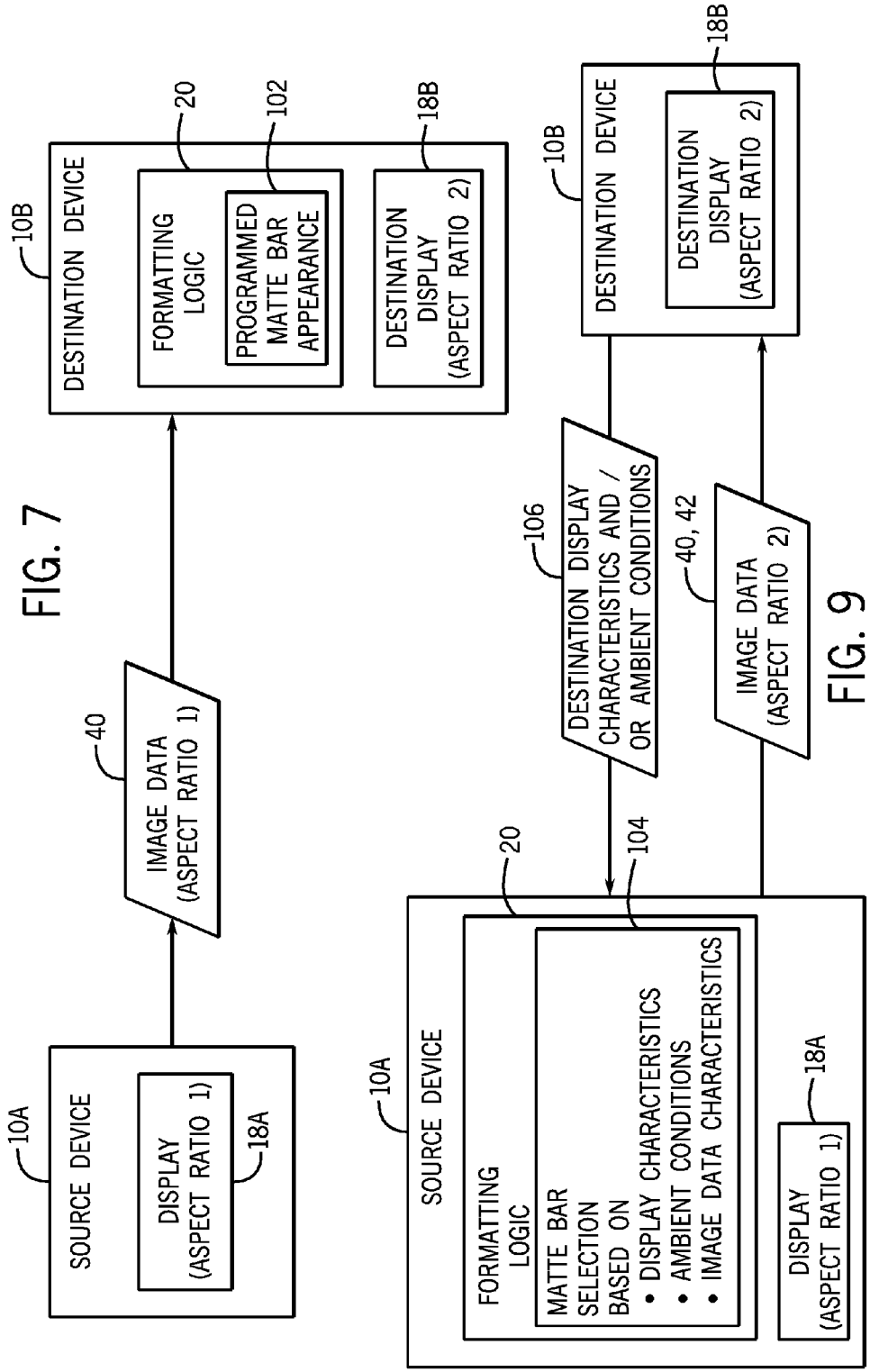
FIG. 7 is a block diagram of a system in which a destination device adds preprogrammed contextual matte bars to format image data for display at a second aspect ratio, in accordance with an embodiment.
Figure 8:
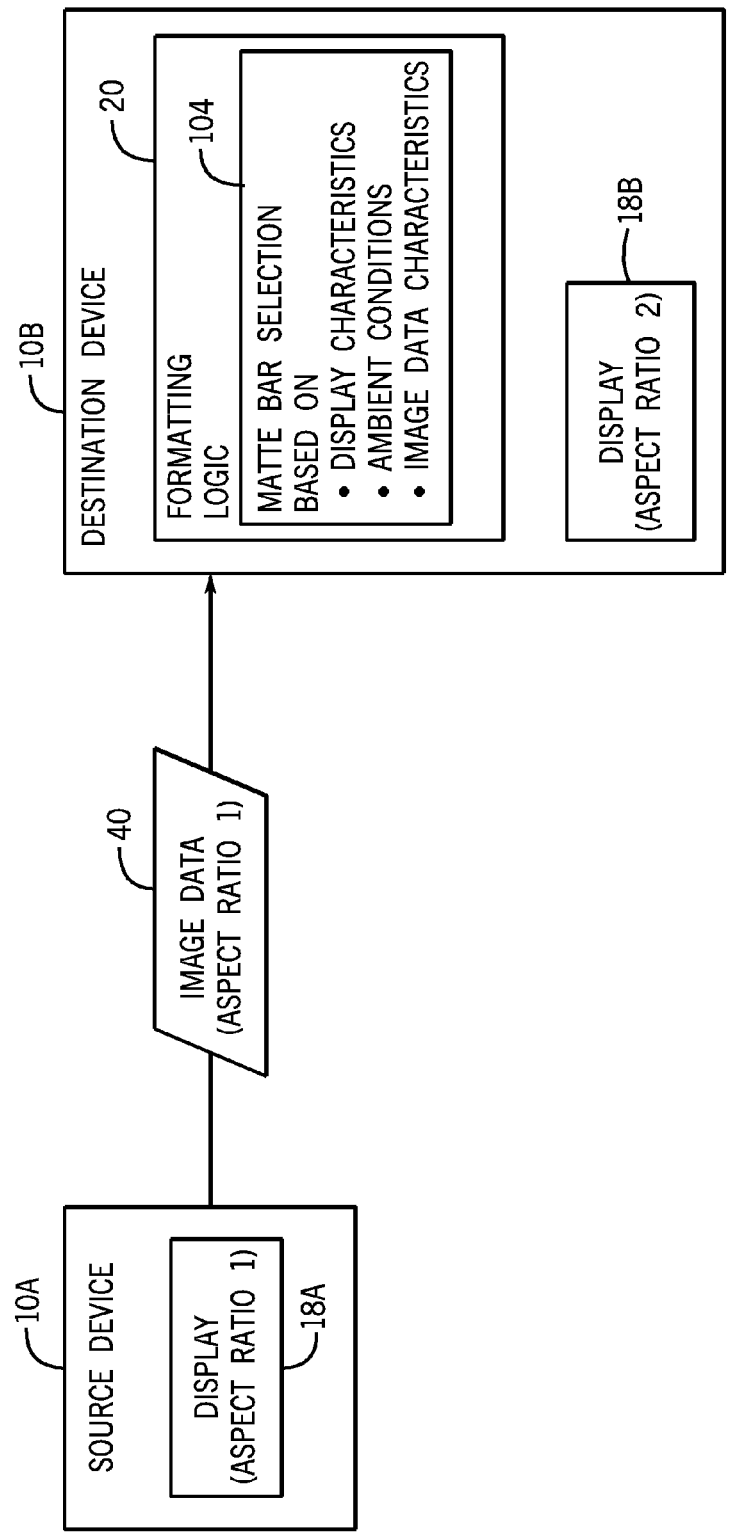
FIG. 8 is a block diagram of a system in which a destination device adds dynamic contextual matte bars to format image data for display at a second aspect ratio, in accordance with an embodiment.

The system 90 shown in FIG. 6 may be represented by schematically as one of a number of possible systems, some of which appear in FIGS. 7-9. In FIG. 7, for example, a source device 10A with a display 18A of a first aspect ratio may provide image data 40 of the first aspect ratio to a destination device 10B. By way of example, the source device 10A and destination device 10B of FIG. 7 may represent the notebook computer 34 and desktop computer 70, respectively, of FIG. 6.

As seen in FIG. 7, the destination device 10B may have a destination display 18B of a second aspect ratio. The destination device 10B may include formatting logic 20 to format the image data 40 for display at the second aspect ratio of the display 18B. The formatting logic 20 at the destination device 10B may add contextual matte bars 42 having a particular, preprogrammed matte bar appearance 102. In one example, the destination device 10B may include a read only memory (ROM) programmed with the preprogrammed matte bar appearance 102 based on the color of the bezel 38 of the destination device 10B. Using the preprogrammed matte bar appearance 102, the formatting logic 20 thus may add the contextual matte bars 42 to have an appearance that matches the bezel 38 of the destination device 10B.

Additionally or alternatively, as shown in FIG. 8, the destination device 10B may select the contextual matte bars 42 based on a variety of variables. In the example of FIG. 8, the source device 10A may have a display 18A of a first aspect ratio. The source device 10A may provide image data 40—which may have been generated originally for display on the display 18A, and thus may have a first aspect ratio—to the destination device 10B. Since the destination device 10B includes a display 18B of a second aspect ratio, the formatting logic 20 of the destination device 10B may format the image data 40 for display at the second aspect ratio.

In the example of FIG. 8, the formatting logic 20 may implement matte bar selection logic 104 to dynamically generate contextual matte bars 42. The matte bar selection logic 104 may consider a variety of variables such as display characteristics, ambient lighting conditions, and image data characteristics to select the appearance of the contextual matte bars 42.

In other examples, such as that shown in FIG. 9, formatting logic 20 in the source device 10A may format the image data 40 for display at the second aspect ratio. As shown in FIG. 9, the source device 10A may have a display 18A of a first aspect ratio. As such, image data that is generated for the display 18A may not be displayed in its native aspect ratio on the display 18B of the destination device 10B, which has a second aspect ratio. As such, the source device 10A may include the formatting logic 20 that implements the matte bar selection logic 104. The source device 10A may receive from the destination device 10B information allowing the formatting logic 20 to appropriately select contextual matte bars 42 for the destination device 10B. For example, the destination device 10B may provide data 106 representing destination display characteristics and/or ambient conditions at the destination display 18B.

By way of example, the source device 10A may be connected to the destination device 10B by way of a video cable 92. When the connection between the source device 10A and the destination device 10B is established over the video cable 92, the destination device 10B may include extended display identification data (EDID). This information may include various information related to the destination display 18B (e.g., a product code associated with the destination display 18B). In some embodiments, the EDID information itself may, in some embodiments, indicate a color or physical texture of the bezel 38 of the display 18B and/or a default coloration to use for the contextual matte bars 42. Additionally or alternatively, the EDID information may enable the source device 10A to search a local or remote database that may indicate the color of the bezel 38 of the display 18B and/or a default appearance to provide for the contextual matte bars 42. For instance, the source device 10A may search a remote database for information related to the destination display 18B characteristics based on the product code in the EDID. As such, it should be appreciated that the EDID information may be used to discern a variety of destination display 18B characteristics, such as a color and/or physical texture of a bezel 38 associated with the destination display 18B; whether the destination display 18B is prone to image burn-in; whether the destination display 18B can format the image data 40 for display at the second aspect ratio; and so forth.

Additionally or alternatively, the source device 10A and destination device 10B may communicate by way of a different communication channel than the video cable 92. For example, the source device 10A and the destination device 10B may communicate via a wireless network such as a Wi-Fi network or a Bluetooth network. Under such a scenario, the destination device 10B may provide the destination display characteristics and/or the ambient conditions at the destination display 18B through such a network connection. For example, the destination device 10B may indicate an ambient lighting condition or a color temperature of lighting at the destination display 18B.

Whether based on information transmitted over a video cable 92 or a wireless network, the formatting logic 20 at the source device 10A may use the data 106 to select the appearance of the contextual matte bars 42 using the matte bar selection logic 104. The source device 10A thus may provide image data 40 that, along with the contextual matte bars 42, is of the second aspect ratio. The destination display 18B of the destination device 10B may display the image data 40 and contextual matte bars 42.

In some cases, it may be desirable to use an intermediate electronic device 10 to format image data 40 of a first aspect ratio for display at a second aspect ratio. An example of this appears in a system 120 of FIG. 10. The system 120 of FIG. 10 includes three electronic devices: a source electronic device 10 (e.g., a notebook computer 34), an intermediate electronic device 10 (e.g., a set top box media player 80), and a destination electronic device 10 (e.g., a television 122). By way of example, a user may desire to display a current screen of original image data 40 (e.g., "screen 1") that is displayed on the user's notebook computer 34 onto a television 122. The original image data 40 on the display 18A of the notebook computer 34 may be formatted at a first aspect ratio (e.g., 16:10), yet the television 122 may have a different aspect ratio of 16:9.

The notebook computer 34 may wirelessly send the original image data 40 to the set top box media player 80. The set top box media player 80 may format the image data 40 for display on the television 122 by adding contextual matte bars 42. The set top box media player 80 may provide the formatted image data 40 with the contextual matte bars 42 for display on the display 18B of the television 122 via a video cable 92. In the example of FIG. 10, the set top box media player 80 is shown to include a camera 30 and an ambient light sensor 32. The camera 30 and the ambient light sensor 32 may detect the ambient lighting conditions around the television 122 and select the appearance of the contextual matte bars 42 appropriately.

Figure 11:
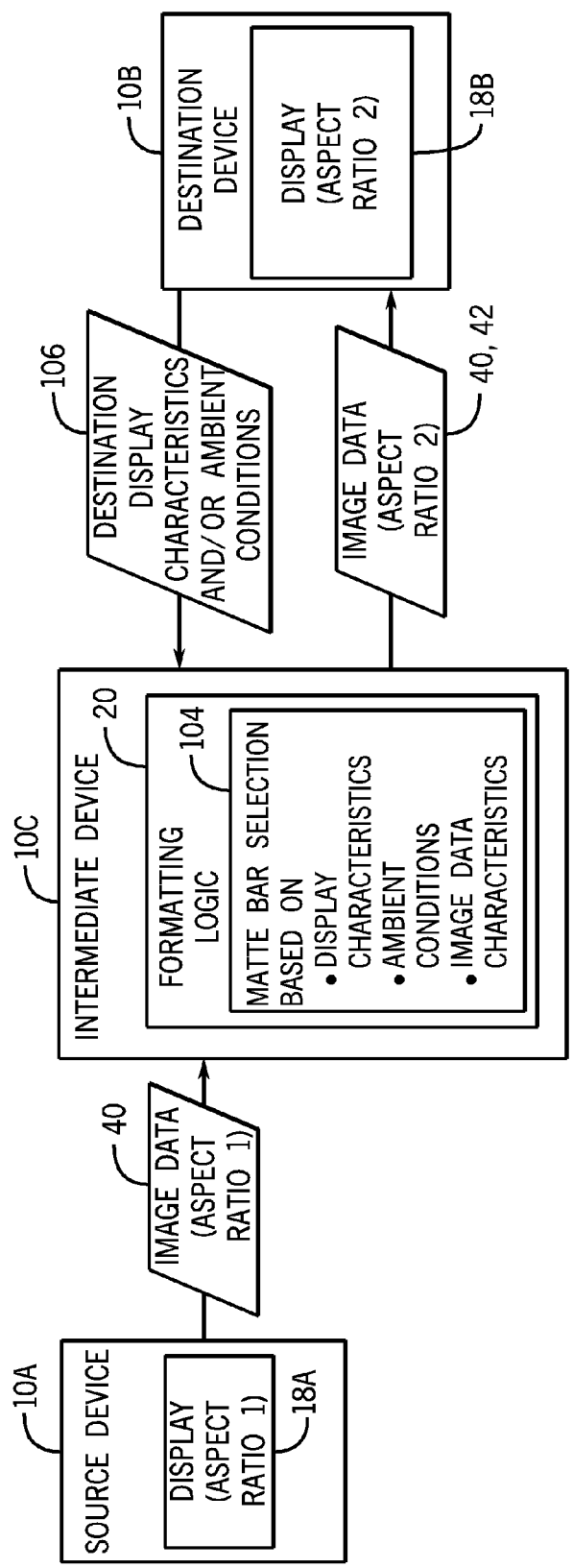
FIG. 11 is a block diagram of a system in which an intermediate device formats image data from a source device for display at a second aspect ratio by adding dynamic contextual matte bars, in accordance with an embodiment.

The system 120 of FIG. 10 may represent one particular example of the more general case illustrated by a block diagram system shown in FIG. 11. The example of FIG. 11 includes a source device 10A with a display 18A of a first aspect ratio, a destination device 10B with a display 18B of a second aspect ratio, and an intermediate device 10C that includes formatting logic 20. The source device 10A may provide the original image data 40 of the first aspect ratio to the intermediate device 10C. The intermediate device 10C may format the image data of the first aspect ratio 40 into image data of the second aspect ratio 40 with contextual matte bars 42 for display on the display 18B of the destination device 10B. The destination device 10B may provide data 106, which may include destination display characteristics and/or ambient lighting conditions to the intermediate device 10C. Additionally or alternatively, the intermediate device 10C may determine the destination display characteristics and/or ambient lighting conditions itself (e.g., via an imaging device 30 and/or an ambient light sensor 32). Additionally or alternatively, the source electronic device 10A may ascertain the ambient lighting conditions and provide an indication of the ambient lighting conditions to the intermediate device 10C. Thus, the formatting logic 20 of the intermediate device 10C may implement matte bar selection logic 104 that can determine the contextual matte bars 42 based on the display characteristics, the ambient conditions, and/or the image data characteristics. The resulting contextual matte bars 42 may be more pleasing to the user than merely providing black matte bars at all times.

Figure 12:
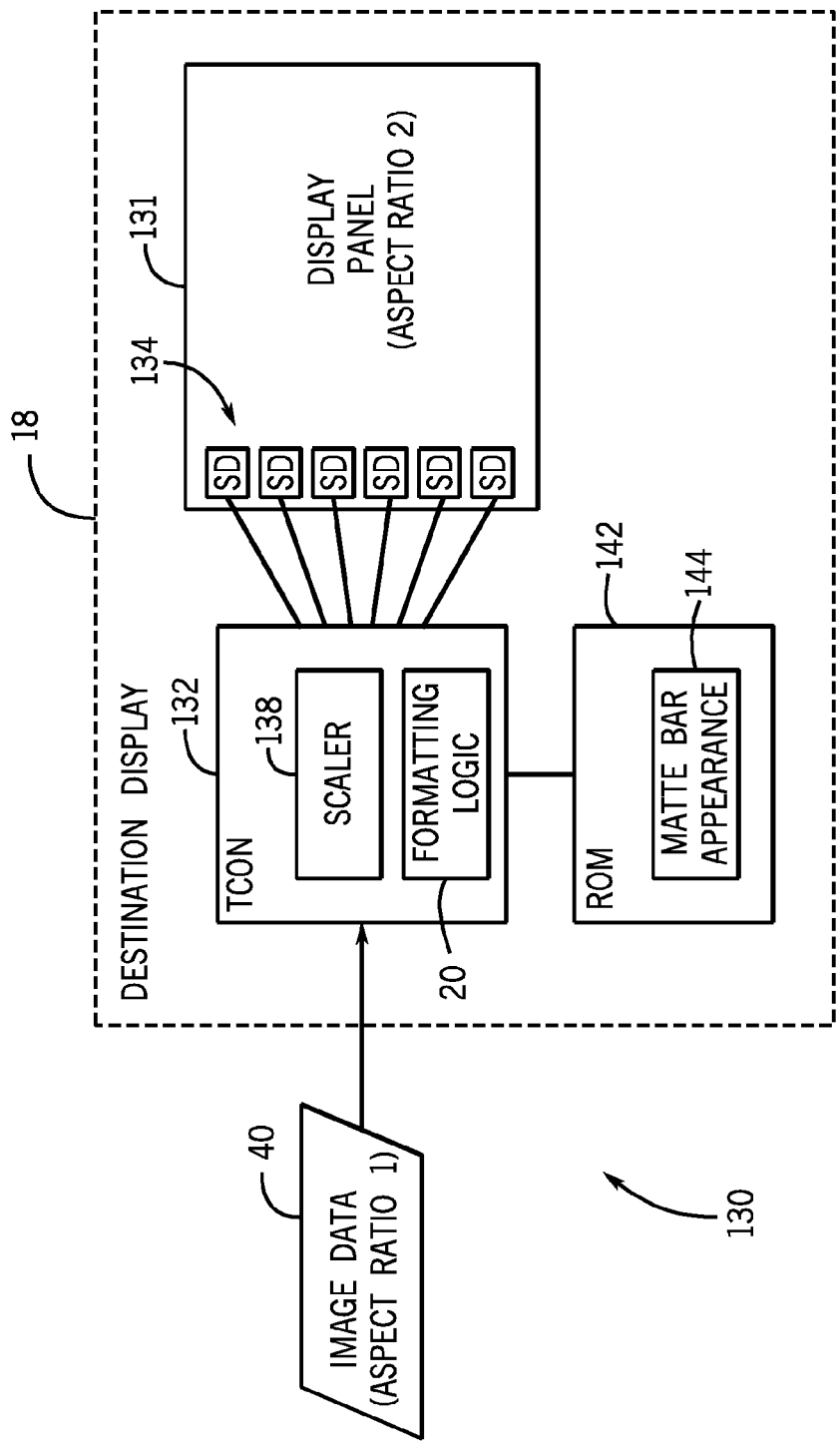
FIG. 12 is a block diagram of an electronic display that adds preprogrammed contextual matte bars to incoming image data, in accordance with an embodiment.

A system 130 shown in FIG. 12 represents one example in which the formatting logic 20 is implemented within a destination display 18 of an electronic device 10. The destination display 18 may receive original image data 40 of a first aspect ratio, although a display panel 131 of the display 18 may have a second aspect ratio. A timing controller (TCON) 132 generally may provide image data (e.g., the image data 40) for display on the display panel 131 through a variety of source drivers (SDs) 134. The TCON 132 may receive the original image data 40, scaling the resolution using a scaler 138 and adding contextual matte bars 42 using the formatting logic 20. Read only memory (ROM) 142 may include a variety of parameters used by the TCON 132. Among other things, the ROM 142 may include a programmed matte bar appearance 144.

The programmed matte bar appearance 144 may include any suitable information to enable the formatting logic 20 to generate the contextual matte bars 42. The contextual matte bars may be added by the formatting logic 20 to transform the image data 40 of the first aspect ratio into image data that can be displayed on the display panel 131 of the second aspect ratio. The programmed matte bar appearance 144 may include, for example, a default color and/or texture of the contextual matte bars 42. By way of example, the programmed matte bar appearance 144 may be programmed based on the color and/or physical texture of the bezel 38 in which the destination display 18 is installed. Thus, to provide one example, the programmed matte bar appearance 144 may be programmed to indicate a default color of gray for the contextual matte bars 42 when the bezel 38 of the display 18 is gray. In some embodiments, the programmed matte bar appearance 144 instead may represent a programmed indication of the color of the bezel 38 of the display 18. In either case, the formatting logic 20 may use the programmed matte bar appearance 144 to generate the contextual matte bars 42.

Figure 13:
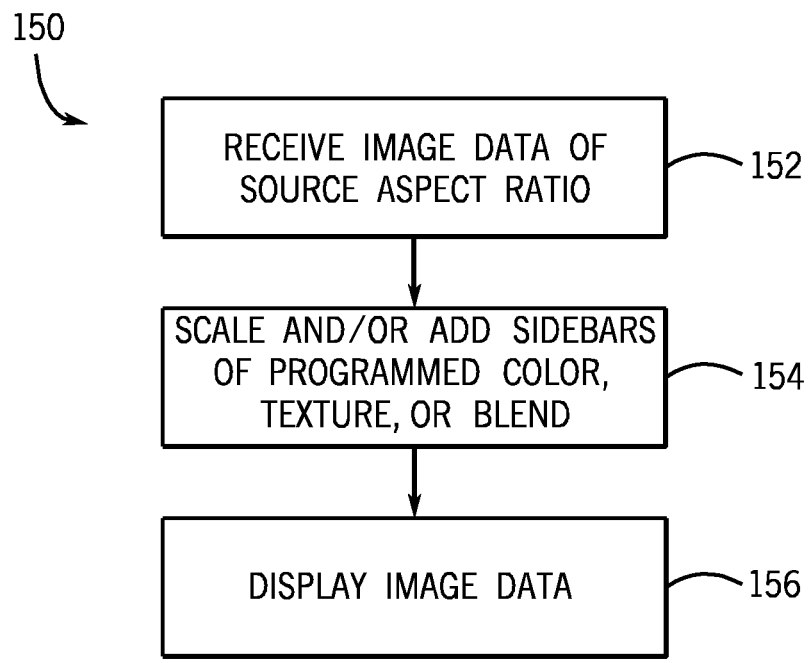
FIG. 13 is a flowchart of a method for adding preprogrammed contextual matte bars to match a bezel of an electronic display, in accordance with an embodiment.

For example, as shown in a flowchart 150 of FIG. 13, the destination display 18 may receive image data 40 of a first source aspect ratio (block 152). The TCON 132 may scale the resolution of the image data 40 using the scaler 138, and the formatting logic 20 may add the contextual matte bars 42 to include an appropriate appearance (block 154). By way of example, the formatting logic 20 may generate the contextual matte bars 42 to have a default appearance based on the programmed matte bar appearance 144 from the ROM 142. Additionally or alternatively, the formatting logic 20 may generate the contextual matte bars 42 to have an appearance depending on an indication of the color of the bezel 38 of the display 18. For example, the formatting logic 20 may set the contextual matte bars 42 to have a generally gray color when the programmed matte bar appearance 144 indicates that the bezel 38 is gray. The resulting contextual matte bars 42, in combination with the image data 40, then may be displayed on the display panel 131 (block 156).

Figure 14:
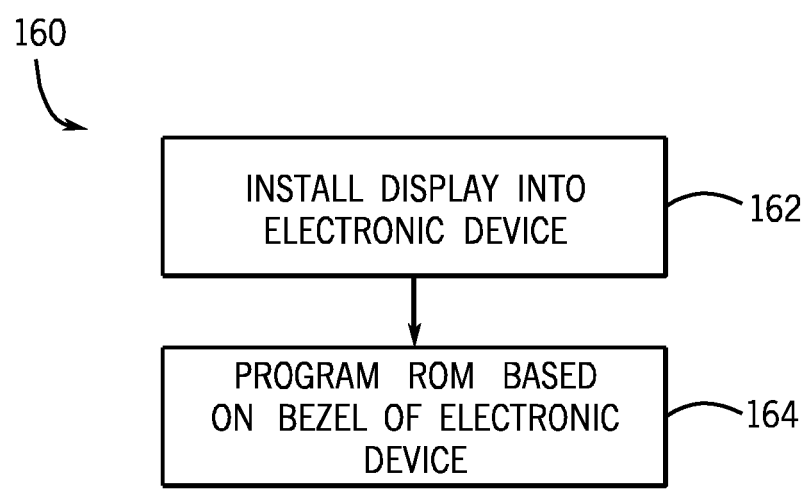
FIG. 14 is a flowchart of a method for manufacturing the electronic display of FIG. 12, in accordance with an embodiment.

The visual appearance of the contextual matte bars 42 may be programmed when the electronic display 18 and/or the electronic device 10 in which the electronic display 18 is installed are manufactured. For instance, as shown by a flowchart 160 of FIG. 14, the electronic display 18 may be manufactured or installed into a particular electronic device 10 (block 162). By way of example, the electronic display 18 may be installed into a desktop computer 70 having a bezel 38 with a brushed metal color and texture. The ROM 142 of the display 18 may be programmed with the programmed matte bar appearance 144 to match the bezel 38 of the electronic device 10 (block 164). For example, the programmed matte bar appearance 144 may indicate that the contextual matte bars 42 should have a gray color or a brushed metal texture.

In other embodiments, the contextual matte bars 42 may be generated dynamically depending on other factors relating to the context in which a user may view the image data 40. Such factors may include, for example, destination display characteristics (e.g., bezel 38 color, propensity for image burn-in), current ambient conditions (e.g., ambient light brightness and/or color temperature), and/or image data characteristics (e.g., motion, coloration, and/or media type). Any suitable logic may carry out the dynamic generation of the contextual matte bars 42 based on such contextual factors.

Figure 15:
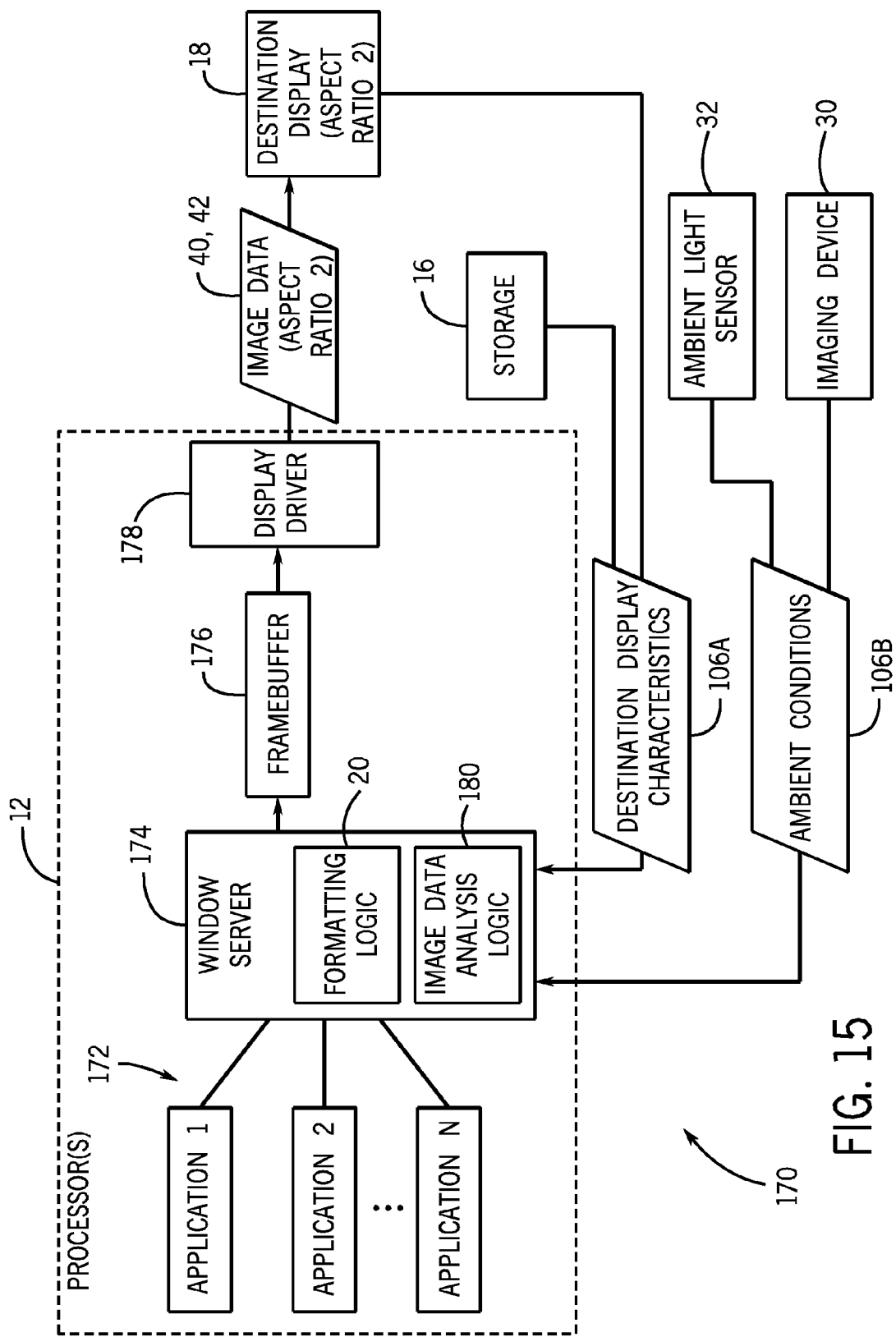
FIG. 15 is a block diagram of a system for generating dynamic contextual matte bars to format image data for display at a second aspect ratio based on destination display characteristics, ambient conditions, and/or image data characteristics, in accordance with an embodiment.

One example of a suitable system to dynamically generate the contextual matte bars 42 is a system 170 of FIG. 15. In the system 170 of FIG. 15, the processor(s) 12 are shown to execute application program(s) 172, here shown as application program(s) 1-N. The application program(s) 172 may generate image data that is provided to a window server 174. The window server 174 may generate image data provided to a frame buffer 176. The frame buffer 176 is schematically illustrated as a component running between the window server 174 and the display driver 178, but it should be appreciated that the image data stored in the frame buffer 176 may in fact be stored in the memory 14, and accessible to the processor(s) 12. The display driver 178 may interface with the destination display 18. Still, it should be appreciated that the components shown in FIG. 15 are provided by way of example, and other components may be employed. For example, a graphics processing unit (GPU) driver may interface with a hardware image processing component of a GPU (which may represent one of the processor(s) 12). Moreover, the window server 174 is shown to implement the formatting logic 20. In other examples, other components may implement the formatting logic 20. For instance, the display driver 174 and/or a GPU driver may implement the formatting logic 20. In general, in either case, the formatting logic 20 may generate the contextual matte bars 42 in a similar manner.

Additionally, before continuing further, it should be noted that the destination display 18 may represent an external or an internal display 18. That is, in some examples, the destination display 18 may represent the display 18 of the electronic device 10 that houses the processor(s) 12 of the system 170 of FIG. 15. Such an electronic device 10 may represent, for example, the destination device 10B of FIG. 8. In other examples, the destination display 18 may represent a display 18 of a different device (e.g., a television 122). For instance, the electronic device 10 that houses the processor(s) 12 of the system 170 may represent the source device 10A of FIG. 9 and the destination display 18 may represent the destination display 18B of FIG. 9. Additionally or alternatively, the electronic device 10 that houses the processor(s) 12 of the system 170 may represent the intermediate device 10C of FIG. 11 and the destination display 18 may represent the destination display 18B of FIG. 11.

Whether the system 170 of FIG. 15 appears in a source device 10A (e.g., of FIG. 9), a destination device 10B (e.g., of FIG. 8), or an intermediate device 10C (e.g., of FIG. 11), the formatting logic 20 may generate contextual matte bars 42 to appear alongside image data 40 on the display 18. The formatting logic 20 may, for instance, convert image data of the first aspect ratio generated by the application program(s) 172 and/or received from some external source (e.g., another electronic device 10) into image data 40, 42 of a second aspect ratio for display on the destination display 18. Destination display characteristics (data 106A), ambient conditions (data 106B), and/or image data characteristics determined by image data analysis logic 180 may enable the formatting logic 20 to generate the contextual matte bars 42 dynamically. The destination display characteristics (data 106A) may be retrieved from storage 16 coupled to the processor(s) 12 and/or may be received from the destination display 18 (e.g., via an indication of an EDID or wirelessly provided by the electronic device 10 housing the destination display 18). The ambient conditions (data 106B) may be retrieved, for example, from an ambient light sensor 32 and/or an imaging device 30 of the electronic device 10 associated with the processor(s) 12.

Although the formatting logic 20 appears in the image data analysis logic 180 is shown to be implemented within the window server 174 in FIG. 15, it should be appreciated that this configuration is merely provided by way of example. Indeed, in other examples, the formatting logic 20 and/or the image data analysis logic 180 may instead appear in the display driver 178, in one of the application program(s) 172, and/or as some standalone software component. Moreover, the formatting logic 20 and/or image data analysis logic 180 may be implemented as hardware logic in other embodiments (e.g., formatting image data 40 as it is being output to the destination display 18).

Figure 16:
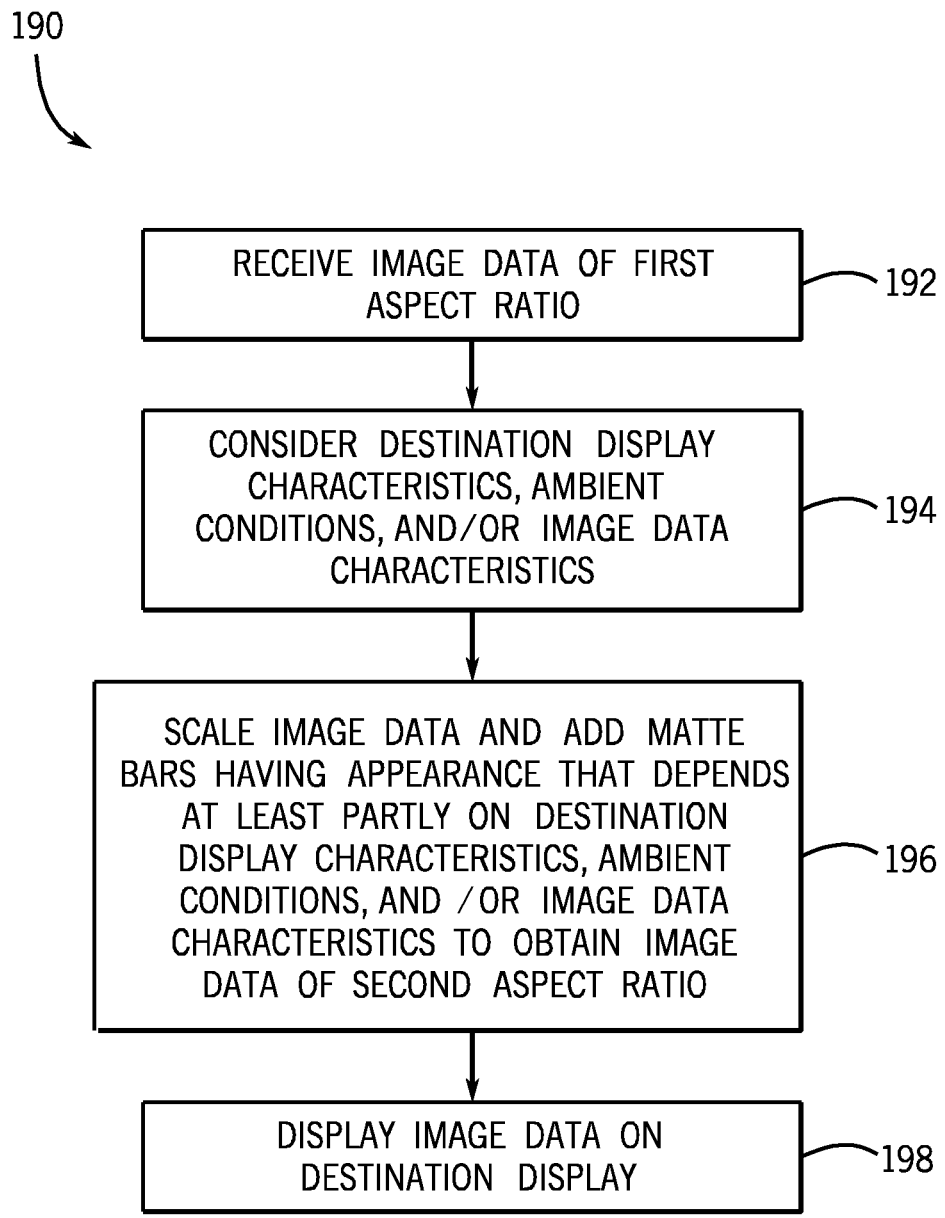
FIG. 16 is a flowchart of a method for formatting image data of a first aspect ratio for display at a second aspect ratio by adding dynamic contextual matte bars, in accordance with an embodiment.

Regardless of its location or implementation as software, hardware, or both, the formatting logic 20 may add the contextual matte bars 42 to the image data 40, 42 provided to the display 18. For example, as shown by a flowchart 190 of FIG. 16, the formatting logic 20 may initially receive image data of a first aspect ratio (block 192). The image data may be provided to the formatting logic 20 as generated by the application program(s) 172 and/or from some external source (e.g., a source electronic device 10). The formatting logic 20 may receive an indication of destination display characteristics, ambient conditions, and/or image data characteristics (block 194). At least partly using the destination display characteristics, the ambient conditions, and/or the image data characteristics, the formatting logic 20 may add contextual matte bars 42 to original image data 40 of the first aspect ratio to obtain image data 40, 42 of the second aspect ratio (block 196). The image data 40, 42 then may be displayed on the display 18 (block 198).

Figure 17:
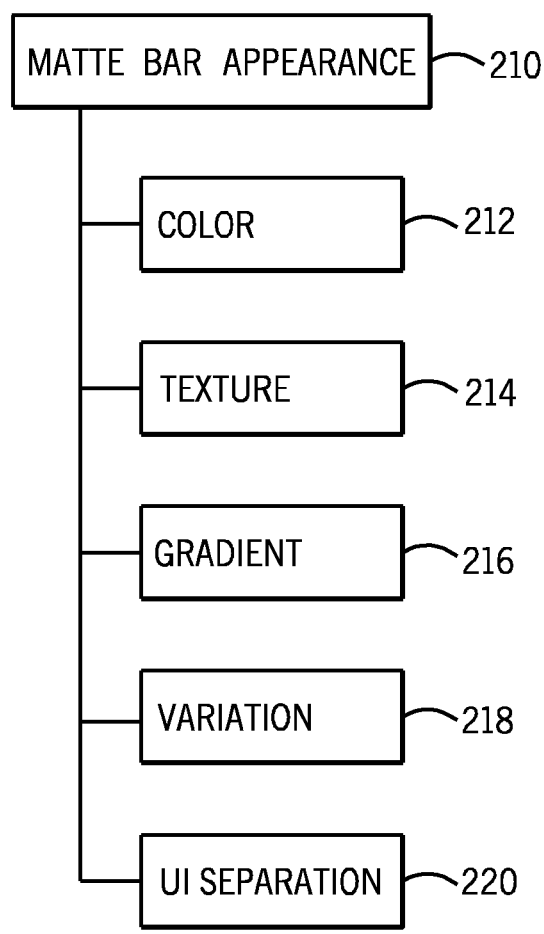
FIG. 17 is a factor diagram illustrating various appearance variables that may be selected for preprogrammed and/or dynamic contextual matte bars, in accordance with an embodiment.

The contextual matte bars 42 may have a matte bar appearance 210 that may vary depending on the context in which a user may view the image data 40 on the destination display 18, as generally illustrated in FIG. 17. In the example of FIG. 17, a first characteristic 212 of the matte bar appearance 210 may be color, a second characteristic 214 may be a visual texture, a third characteristic 216 may be a gradient, a fourth characteristic 218 may be a variation in any of the above over time, and a fifth characteristic 220 may be a separation of the contextual matte bars 42 from other user interface (UI) items. These various characteristics 212-220 are provided by way of example and are not intended to represent an exhaustive list of potential matte bar appearances 210 the contextual matte bars 42 may take. Indeed, the matte bar appearance 210 may include any other factors that may visually impact the appearance of the contextual matte bars 42.

Figure 19:
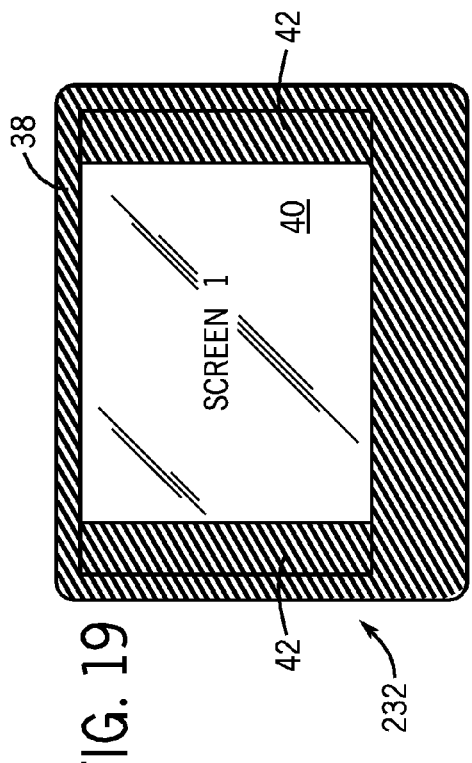
FIGS. 18-22 are front views of electronic displays illustrating different contexts in which the matte bar appearance variables of FIG. 17 may be employed, in accordance with embodiments.
Figure 18:
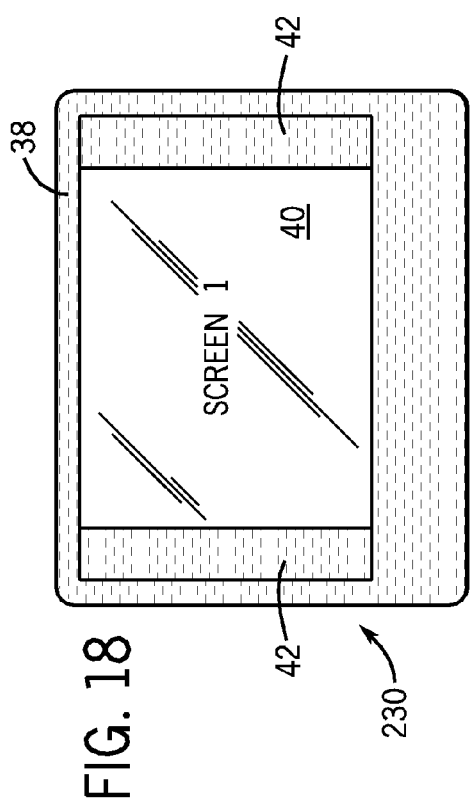
Figure 20:
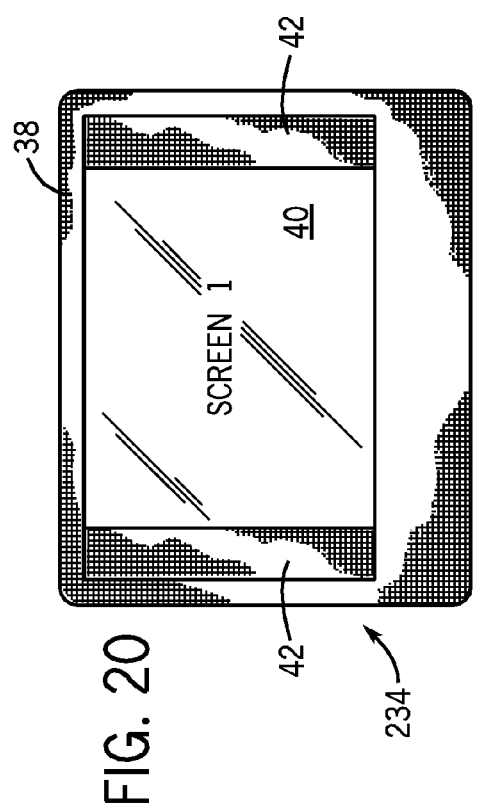
Figure 22:
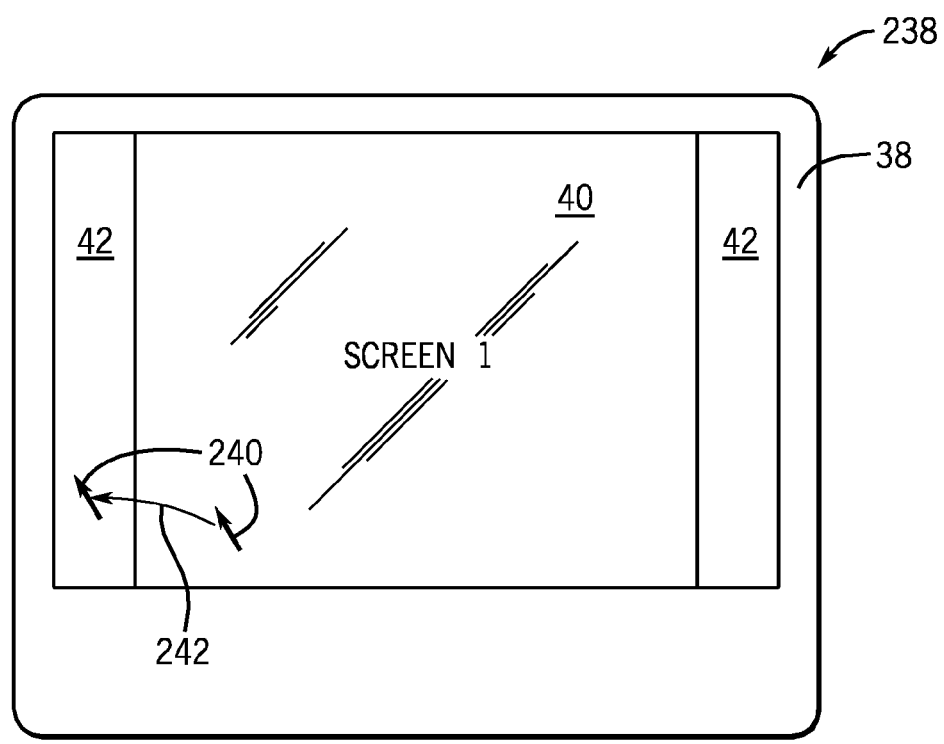

Some examples of use cases of the characteristics 212, 214, 216, 218, and 220 appear in FIGS. 18-22. Considering first the first characteristic 212, color, FIGS. 18 and 19 illustrate selections of two different colors of contextual matte bars 42 for displays 230 and 232, which respectively have bezels 38 of different colors. In FIG. 18, the bezel 38 of the display 230 is gray, while in FIG. 19, the bezel 38 of the display 232 is black. The matte bar appearance 210 of the contextual matte bars 42 thus may vary in color (characteristic 212) accordingly. When the image data 40 plus the contextual matte bars 42 are provided to the display 230 in FIG. 18, the formatting logic 20 may select the contextual matte bars 42 to be gray to match the color of the bezel 38 of the display 230. When the image data 40 plus the contextual matte bars 42 are provided to the display 232 in FIG. 19, the formatting logic 20 may select the contextual matte bars 42 to be black to match the color of the bezel 38 of the display 232.

The bezels 38 of some displays may not have a uniform color such as gray (FIG. 18) or black (FIG. 19), but instead may have some form of physical texture. In one example, a display 234 shown in FIG. 20 may have a bezel 38 with a brushed metal texture. The brushed metal texture of the bezel 38 of the display 234 may not be a uniform color, but may glisten and shimmer in the ambient light. Since contextual matte bars 42 of a single uniform color may not match the bezel 38 of the display 234, the formatting logic 20 may instead generate the contextual matte bars 42 to match the physical texture of the bezel 38. Thus, the contextual matte bars 42 provided to the display 234 may have a matte bar appearance 210 that includes a visual texture (characteristic 214) that mimics the brushed metal texture of the bezel 38 of the display 234. Such a visual texture (characteristic 214) may be generated based on a texture model and/or may be generated from a series of preprogrammed texture frames. Indeed, the texture model may vary in some embodiments based on the ambient conditions. For instance, as discussed further below, the visual texture (characteristic 214) of the contextual matte bars 42 may vary depending on the amount and/or color temperature of the ambient lighting conditions to match the way in which the ambient light is striking the bezel 38. The texture model and/or series of preprogrammed texture frames may be adjusted based on such additional variables to account for the ambient conditions.

Figure 21:
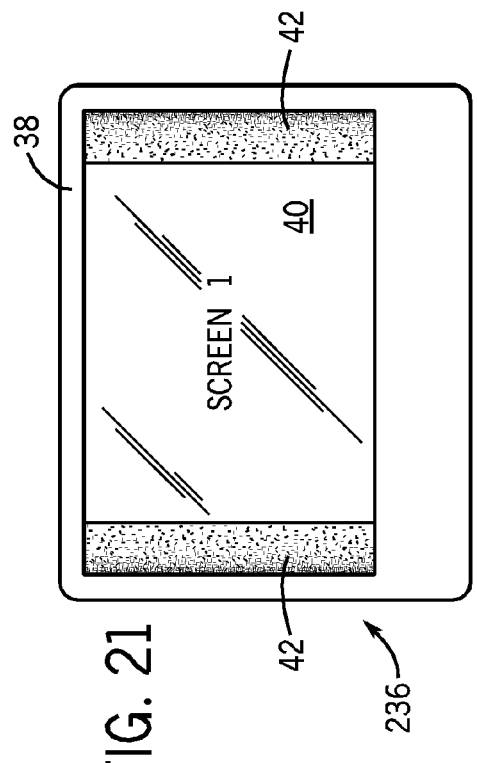

As shown in FIG. 21, the matte bar appearance 210 also may vary a gradient (characteristic 216) of the contextual matte bars 42. In the example of FIG. 21, a display 236 has received image data 40 plus contextual matte bars 42. The contextual matte bars 42 employ a gradient of one color, brightness, and/or texture to another color, brightness, and/or texture. The contextual matte bars 42 may employ a gradient (characteristic 216), for example, when the image data 40 and the bezel 38 are strikingly different. In such cases, the contextual matte bars 42 may reduce the user's perception of these striking differences. In other examples, the gradient (characteristic 216) may be employed for any other suitable reasons, such as user feedback indicating that a gradient is more pleasing than a uniform color and/or texture.

In some instances, the matte bar appearance 210 may undergo variation (characteristic 218). For instance, to prevent burn-end on a display 18 that is susceptible to burn-end, the color (characteristic 212), the texture (characteristic 214), and/or the gradient (characteristic 216) may occasionally change over time. The differences may be minor but may prevent the display 18 from suffering from image burn-in damage. Additionally or alternatively, the contextual matte bars 42 may have greater temporal variation (characteristic 218) to coincide with activity in the image data 40. For example, during periods of rapid changes in the image data 40, the contextual matte bars 42 may vary more quickly than during periods of relative calm.

The contextual matte bars 42 also may or may not be separated from other components of a user interface (characteristic 220) appearing in the original data 40. By way of example, on a display 238 shown in FIG. 22, a cursor 240 shown in the original image data 40 may or may not be permitted to move 242 onto the contextual matte bars 42. The user's ability to move the cursor 240 away from the original image data 40 and onto the contextual matte bars 42 may vary depending, for example, on the content of the original image data 40. In one example, the cursor 240 may be permitted to cross onto the contextual matte bars 42 when the contextual matte bars 42 have a similar color as the original image data 40. In another example, the cursor 240 may be permitted to cross onto the contextual matte bars 42 when the image data 40 is displaying a particular media type (e.g., a movie) such that moving the cursor 240 may be desirable to indicate the cursor 240 should be made invisible. On the other hand, in some embodiments, the cursor 240 may not be permitted to cross onto the contextual matte bars 42 when the image data 40 is displaying some other media (e.g., a user interface desktop) to prevent the user from mistaking the contextual matte bars 42 as user interface elements.

Figure 23:
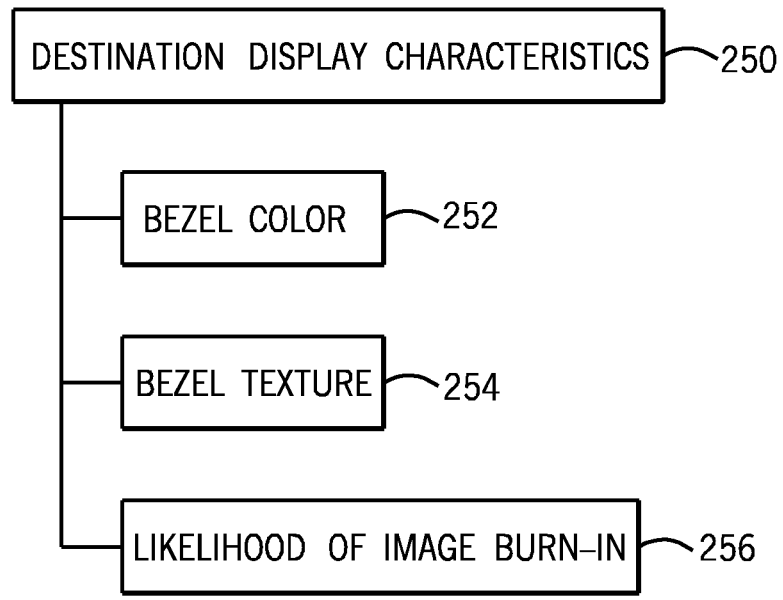
FIG. 23 is a factor diagram illustrating various destination display characteristics that may influence the appearance of contextual matte bars, in accordance with an embodiment.

The appearance 210 of the contextual matte bars 42 may be selected based at least in part on destination display characteristics 250, as generally illustrated in FIG. 23. In the example of FIG. 23, a first characteristic 252 of the destination display characteristics 250 may be a color of the bezel 38 of the destination display 18, a second characteristic 254 may be a texture of the bezel 38, and/or a third characteristic 256 may be propensity or likelihood of image burn-in of the destination display 18. These various characteristics 252-256 are provided by way of example and are not intended to represent an exhaustive list of potential destination display characteristics 250 that may affect the appearance 210 of the contextual matte bars 42. Indeed, the destination display characteristics 250 may include any other factors that may affect the context in which a user may view the contextual matte bars 42. It should be appreciated that one or more, all, or none of the destination display characteristics 250 may be provided to and/or considered by the formatting logic 20 to generate the contextual matte bars 42.

Considering each of the destination display characteristics 250 shown in FIG. 23 individually, the first characteristic 252, the bezel 38 color, may be used by the formatting logic 20 to select the color (characteristic 210) of the contextual matte bars 42. For instance, when the bezel 38 has a generally gray color, the contextual matte bars 42 may have a generally gray color; when the bezel 38 has a generally black color, the contextual matte bars 42 may have a generally black color; when the bezel 38 has a white color, the contextual matte bars 42 may have a generally white color; and so forth. The bezel 38 color (characteristic 252) may also be used by the formatting logic 20 to set a default color of the contextual matte bars 42. The formatting logic 20 may deviate from the default color based on other considerations, such as ambient lighting conditions or the bezel 38 texture (characteristic 254).

Indeed, the second characteristic 254 of the destination display characteristics 250, the bezel 38 texture, may be used by the formatting logic 20 to select a visual texture (characteristic 212) or a color (characteristic 210) of the contextual matte bars 42. For example, the formatting logic 20 may select a particular texture model or series of programmed textural frames to cause the contextual matte bars 42 to generally match the bezel 38 texture (characteristic 254). In another example, the formatting logic 20 may select a particular color (characteristic 210) of the contextual matte bars 42 depending on the bezel 38 texture (characteristic 254). By way of example, the formatting logic 20 may select a brighter color when the bezel 38 texture is more reflective and thus more prone to shining and shimmering, and may select a less bright color when the bezel 38 texture is less reflective and/or subdued.

Since certain types of displays 18 may be more prone to image burn-in, the formatting logic 20 may consider this characteristic 256 to prevent the contextual matte bars 42 from damaging the display 18. Some displays 18—particularly older displays 18 and/or plasma displays 18—may be prone to image burn-in when an image is displayed for an extended period of time. The formatting logic 20 thus may consider the likelihood of image burn-in (characteristic 256) when generating the contextual matte bars 42. For example, when the likelihood of image burn-in (characteristic 256) is relatively higher, the formatting logic 20 may increase the variation (characteristic 218) of the contextual matte bars 42 over time. Additionally or alternatively, when the likelihood of image burn-in (characteristic 256) is relatively higher, the formatting logic 20 may select a color (characteristic 210) or texture (characteristic 212) for the contextual matte bars 42 that may be less likely to result in damage.

Figure 24:
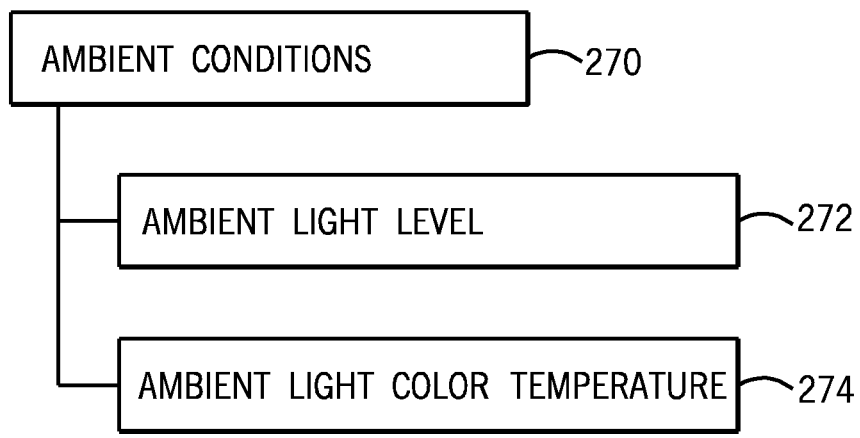
FIG. 24 is a factor diagram of various ambient conditions that may influence the appearance of contextual matte bars, in accordance with an embodiment.

As discussed above, the formatting logic 20 may additionally or alternatively consider ambient lighting conditions at the destination display 18 when generating the contextual matte bars 42. Some ambient lighting conditions 270 that may be considered appear in FIG. 24. In the example of FIG. 24, a first characteristic 272 of the ambient lighting conditions 270 may be an ambient light level or brightness around the destination display 18 and a second characteristic 274 may be color temperature of the ambient light. These various characteristics 272 and 274 are provided by way of example and are not intended to represent an exhaustive list of potential ambient lighting conditions 270 that may affect the appearance 210 of the contextual matte bars 42. Indeed, the ambient lighting conditions 270 may include any other factors that may affect the context in which a user may view the contextual matte bars 42. It should be appreciated that one or more, all, or none of the ambient lighting conditions 270 may be provided to and/or considered by the formatting logic 20 to generate the contextual matte bars 42.

For example, an image captured by a camera on an electronic device 10 (e.g., a handheld device 50) may be used as an ambient condition 270 to ascertain how well the contextual matte bars 42 match the adjacent bezel 38 of the destination display 18. That is, the formatting logic 20 may use such an image as negative feedback to correct user-perceptible differences between the bezel 38 and the contextual matte bars 42 (e.g., adjusting the color, brightness, visual texture, and so forth of the contextual matte bars 42 based on the feedback image). The feedback image may be captured when a user takes a photo of the user's destination display 18 and provided over a cable or network (e.g., a wired or wireless network connection between the electronic device 10 capturing the feedback image and the electronic device 10 that is generating the contextual matte bars 42).

Figure 25:
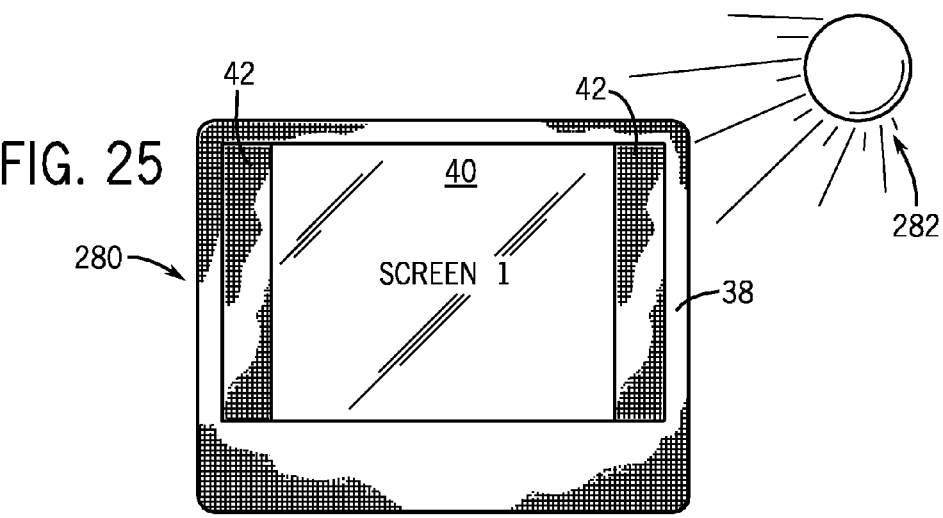
FIGS. 25-27 are front views of an electronic display illustrating how different ambient conditions may influence the appearance of contextual matte bars, in accordance with embodiments.
Figure 26:
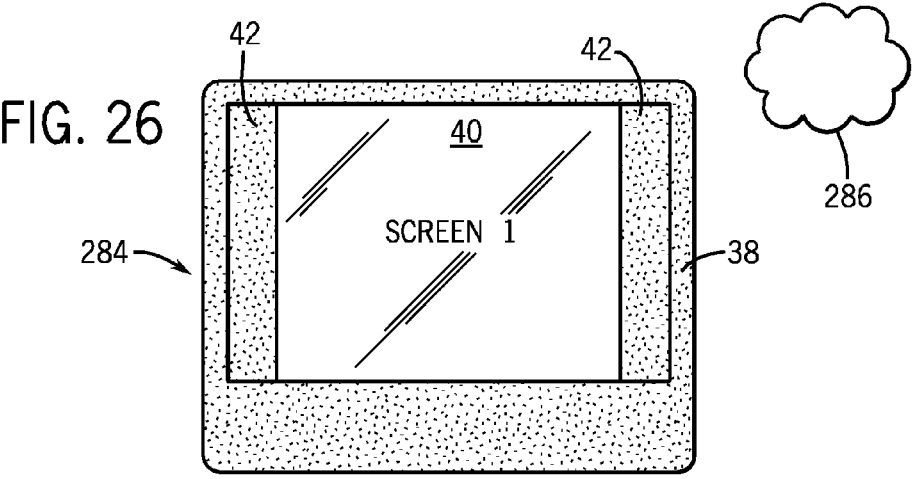
Figure 27:
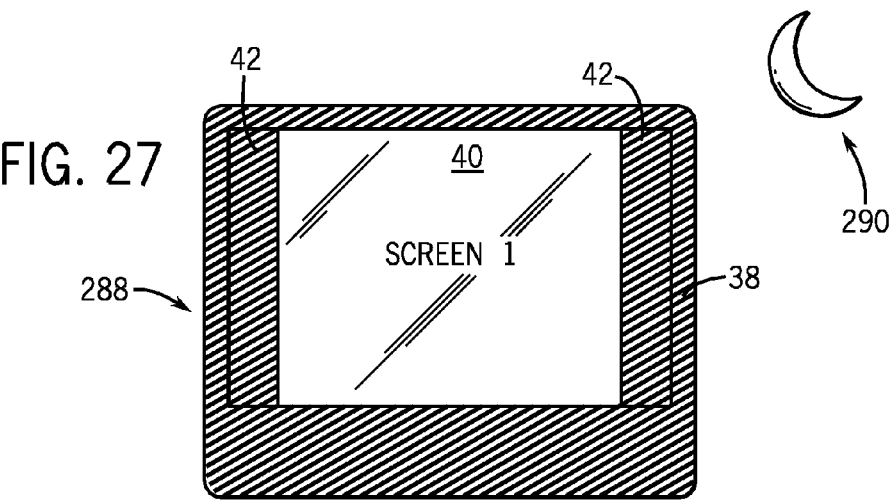

The formatting logic 20 may modify the appearance of the contextual matte bars 42 as the ambient conditions 270 change. Indeed, as shown in FIGS. 25-27, a user's perception of the appearance of a bezel 38 may change as the context of the ambient lighting changes. For example, in a daylight context 280 with direct sunlight 282 or other direct light sources, as shown in FIG. 25, a bezel 38 of brushed metal may appear bright and reflective. The ambient lighting conditions 270 may indicate this strong brightness (characteristic 272) or warm color temperature (characteristic 274). The formatting logic 20 thus may generate contextual matte bars 42 that are correspondingly bright and shiny and/or shimmery.

In an indirect-light context 284 with diffuse light 286, as shown in FIG. 26, the bezel 38 of brushed metal may appear more subdued. The ambient lighting conditions 270 may indicate this decreased brightness (characteristic 272) or cooler color temperature (characteristic 274). In response, the formatting logic 20 may generate contextual matte bars 42 that are correspondingly cooler and more subdued, and less bright and shiny or shimmery.

Finally, in a dark context 288 with very little light 290 (e.g., at night or in a dark room), as shown in FIG. 27, the bezel 38 of brushed metal may actually appear dark. The ambient lighting conditions 270 may indicate the lack of light (characteristic 272). In response, the formatting logic 20 may generate contextual matte bars 42 that are correspondingly dark. In this way, the contextual matte bars 42 may vary to match the changing context of different ambient lighting conditions.

Figure 28:
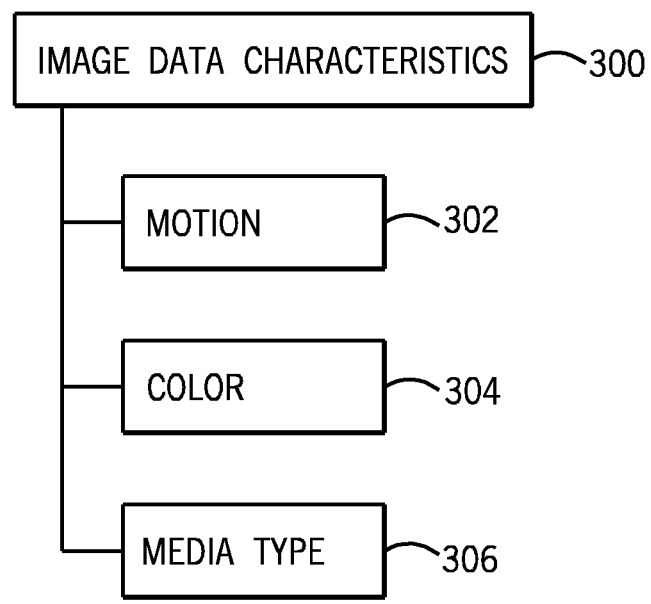
FIG. 28 is a factor diagram of various image data characteristics that may influence the appearance of dynamic contextual matte bars, in accordance with an embodiment.

The formatting logic 20 may consider still other factors to generate the contextual matte bars. For example, as shown in FIG. 28, the formatting logic 20 may consider various image data characteristics 300. In the example of FIG. 28, a first characteristic 302 of the ambient lighting conditions 300 may be an amount of on-screen motion of the image data 40, a second characteristic 304 may be a prominent color among the image data 40, and a third characteristic 306 may be a type of media represented by the image data 40 (e.g., movie, still photos, working applications, or user desktop). These various characteristics 302-306 are provided by way of example and are not intended to represent an exhaustive list of potential image data characteristics 300 that may affect the appearance 210 of the contextual matte bars 42. Indeed, the image data characteristics 300 may include any other factors that may affect the context in which a user may view the contextual matte bars 42. It should be appreciated that one or more, all, or none of the image data characteristics 300 may be provided to and/or considered by the formatting logic 20 to generate the contextual matte bars 42

Considering the image data characteristics 300 individually, the formatting logic 20 may use the amount of motion (characteristic 302) to select the appearance of the contextual matte bars 42 in a variety of possible ways. For instance, the formatting logic 20 may choose to change the appearance of the contextual matte bars 42 (e.g., to prevent image burn-in) during periods of high motion in the image data 40 to reduce the likelihood that such changes in the contextual matte bars 42 will be distracting. In another example, the formatting logic 20 may vary the appearance of the texture of the contextual matte bars 42 as the amount of motion in the image data 40 changes.

A color (characteristic 304) of the image data 40 may also affect the context in which a user perceives the image data and the contextual matte bars 42. As such, the formatting logic 20 may generate the appearance of the contextual matte bars 42 based at least partly on the color (characteristic 304) of the image data 40. For example, when the image data 40 is a bright white color, the contextual matte bars 42 may be generated to be brighter than when the image data 40 is a deep black. In another example, the formatting logic 20 may generate the contextual matte bars 42 to generally match the most or least prominent color. Moreover, in some embodiments, the formatting logic 20 may generate contextual matte bars 42 that generally blend in with the colors along the edges of the image data 40.

Some users may desire contextual matte bars 42 that vary depending on the media type (characteristic 306) of the image data 40. For example, when the image data 40 represents a movie or video media or still photos, the formatting logic 20 may generate contextual matte bars 42 that are generally less likely to be noticeable alongside the content (e.g., black matte bars). When the image data 40 represents working applications or a user desktop, the formatting logic 20 may generate contextual matte bars 42 that better match the bezel 38.

It should be appreciated that the formatting logic 20 may consider any of the various factors for destination display characteristics 250, ambient lighting conditions 270, and/or image data characteristics 300 to determine the contextual matte bars 42. The various examples described in this disclosure are intended to represent only some of the ways in which the contextual matte bars 42 may be generated depending on the context in which a user is to view the image data 40. Indeed, the formatting logic 20 may consider any or all suitable factors relating to the context in which a user will view reformatted image data 40 at a new aspect ratio to generate contextual matte bars 42 that may be pleasing to the user.

That is, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
receiving first image data of a first aspect ratio into a processor;
receiving, into the processor, an indication of a characteristic of a destination electronic display comprising a physical texture of a bezel of the destination electronic display, wherein the destination electronic display comprises a second aspect ratio;
adding matte bars to the first image data or a scaled version of the first image data in the processor to obtain second image data of the second aspect ratio, wherein an appearance of the matte bars depends on the indication of the characteristic of the destination electronic display, wherein when the bezel of the destination electronic display has a first physical texture, the appearance of the matte bars has a first visual texture, and when the bezel of the destination electronic display has a second physical texture, the appearance of the matte bars has a second visual texture; and
providing the second image data from the processor to the destination electronic display.

2. The method of claim 1, wherein the characteristic of the destination electronic display comprises a color of the bezel of the destination electronic display, an indication of a proclivity of the electronic display for image burn-in, or any combination thereof.

3. The method of claim 1, comprising receiving, into the processor, an indication of an ambient condition of the destination electronic display, wherein the appearance of the matte bars depends on the indication of the ambient condition of the destination electronic display, and wherein the ambient condition of the electronic display comprises:
an ambient brightness;
a color temperature of ambient light; or
a feedback image from a camera facing the destination electronic display; or
any combination thereof.

4. The method of claim 1, wherein the appearance of the matte bars comprises:
a color of the matte bars;
a visual texture of the matte bars;
a gradient of the matte bars;
a variability of the matte bars over time; or
a relationship between a user interface and the matte bars; or
any combination thereof.

5. The method of claim 1, comprising receiving, into the processor, an indication of a characteristic of the image data, wherein the appearance of the matte bars depends on the indication of the characteristic of the image data, and wherein the characteristic of the image data comprises:
an amount of motion of the image data;
a prominent color of the image data; or
a media type of the image data; or
any combination thereof.

6. A system comprising:
a first electronic device configured to convert image data of a first aspect ratio into image data of a second aspect ratio at least in part by generating and adding matte bars to the image data; and
a destination electronic display of the second aspect ratio configured to display the image data of the second aspect ratio;
wherein the first electronic device is configured to generate an appearance of the matte bars when generating the matte bars, wherein the appearance depends on a characteristic of the destination electronic display comprising a physical texture of a bezel of the destination electronic display.

7. The system of claim 6, wherein the destination electronic display is a component of the first electronic device.

8. The system of claim 7, wherein the first electronic device is configured to generate the image data of the first aspect ratio.

9. The system of claim 7, comprising a second electronic device configured to generate the image data of the first aspect ratio and provide the image data of the first aspect ratio to the first electronic device.

10. The system of claim 6, comprising:
a second electronic device configured to generate the image data of the first aspect ratio and provide the image data of the first aspect ratio to the first electronic device; and
a third electronic device configured to receive the image data of the second aspect ratio from the first electronic device and provide the image data of the second aspect ratio to the destination electronic display, wherein the destination electronic display is a component of the third electronic device.

11. The system of claim 6, wherein the first electronic device is configured to vary the appearance of the matte bars by varying a hue of the matte bars based on an ambient condition of the destination electronic display, wherein the ambient condition comprises an ambient light level around the destination electronic display.

12. The system of claim 6, wherein the characteristic of the destination electronic display comprises information indicated in an extended display identification data (EDID) of the destination electronic display.

13. A method for manufacturing an electronic display, the method comprising:
providing a display panel of a first aspect ratio;
providing a display controller configured to:
receive image data of a second aspect ratio;
convert the image data of the second aspect ratio into image data of the first aspect ratio by adding matte bars having a programmed appearance to the image data of the second aspect ratio; and
program the display panel using the image data of the first aspect ratio;
providing a storage device configured to store the programmed appearance of the matte bars;
when the electronic display is configured to be installed in a first frame having a first bezel having a first bezel appearance, storing the programmed appearance to be a first matte bar appearance; and
when the electronic display is configured to be installed in a second frame having a second bezel having a second bezel appearance, storing the programmed appearance to be a second matte bar appearance;
wherein the first matte bar appearance has a first visual texture and the second matte bar appearance has a second visual texture when the first bezel appearance has a first physical texture and the second bezel appearance has a second physical texture.

14. The method of claim 13, wherein the first matte bar appearance has a lighter color than the second matte bar appearance when the first bezel appearance is lighter or more reflective, or both, than the second bezel appearance.

15. One or more non-transitory computer-readable media comprising instructions to:
convert image data of a first aspect ratio into image data of a second aspect ratio at least in part by adding matte bars to the image data; and
provide the image data of the second aspect ratio to a destination display of the second aspect ratio;
wherein the matte bars have a first appearance when the destination display has a first destination display characteristic and a second appearance when the destination display has a second destination display characteristic, wherein the first destination display characteristic and the second destination display characteristic comprise a physical texture of the bezel of the electronic display, and the first appearance and the second appearance of the matte bars comprise a visual texture corresponding to different respective physical textures of the bezel of the destination display.

16. The computer-readable media of claim 15, comprising instructions to receive the destination display characteristics from the destination display, a storage, or a memory, or any combination thereof.

17. The computer-readable media of claim 15, wherein the instructions to convert the image data of the first aspect ratio into image data of the second aspect ratio comprise instructions to scale the image data to a resolution of the destination display.

18. The computer-readable media of claim 15, comprising instructions to generate the image data of the first aspect ratio using a window server that receives image information from one or more application programs.

19. The computer-readable media of claim 15, comprising instructions to receive the image data of the first aspect ratio from an external source electronic device.

20. An electronic device comprising:
an electronic display of a first aspect ratio; and
a processor configured to convert image data of a second aspect ratio to image data of the first aspect ratio by adding contextual matte bars, wherein the contextual matte bars have an appearance selected automatically based at least in part on a characteristic of the electronic display comprising a physical texture of a bezel of the electronic display, and wherein the appearance of the contextual matte bars comprises a visual texture that varies depending on the physical texture of the bezel of the electronic display.

21. The electronic device of claim 20, comprising input/output circuitry configured to receive the image data of the second aspect ratio from a source electronic device configured to generate the image data of the second aspect ratio.

22. The electronic device of claim 20, wherein the electronic device comprises a television, a notebook computer, a desktop computer, a handheld device, a portable media player, a cellular phone, a gaming device, or any combination thereof.

23. The electronic device of claim 20, wherein the contextual matte bars have an appearance selected automatically based at least in part on an ambient condition of the electronic device, wherein the ambient condition of the electronic device comprises an ambient light level comprising an ambient light sensor configured to detect the ambient light level.

* * * * *